United States Patent
Toyama et al.

(10) Patent No.: US 8,951,448 B2
(45) Date of Patent: Feb. 10, 2015

(54) CATHODE MATERIAL FOR LITHIUM SECONDARY BATTERY, LITHIUM SECONDARY BATTERY, AND SECONDARY BATTERY MODULE USING THE BATTERY

(75) Inventors: Tatsuya Toyama, Hitachi (JP); Kazushige Kohno, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 614 days.

(21) Appl. No.: 13/034,601

(22) Filed: Feb. 24, 2011

(65) Prior Publication Data

US 2011/0217574 A1 Sep. 8, 2011

(30) Foreign Application Priority Data

Mar. 5, 2010 (JP) .................................. 2010-048597

(51) Int. Cl.
- *H01M 4/48* (2010.01)
- *H01M 10/42* (2006.01)
- *H01M 4/50* (2010.01)

(Continued)

(52) U.S. Cl.
CPC *H01M 4/48* (2013.01); *H01M 4/50* (2013.01); *H01M 4/505* (2013.01); *H01M 4/52* (2013.01); *H01M 10/42* (2013.01); *Y02E 60/122* (2013.01)
USPC ................ 252/521.6; 252/518.1; 429/231.95; 429/231.1; 204/290.01; 204/292

(58) Field of Classification Search
USPC .............................................. 252/500, 518.1
See application file for complete search history.

(56) References Cited

U.S. PATENT DOCUMENTS

| 7,135,251 B2 | 11/2006 | Cho et al. |
| 2008/0063941 A1 | 3/2008 | Itaya |
| 2009/0136838 A1 | 5/2009 | Abe et al. |

(Continued)

FOREIGN PATENT DOCUMENTS

| CN | 101060173 A | 10/2007 |
| CN | 101145609 A | 3/2008 |

(Continued)

OTHER PUBLICATIONS

Cho et al. English text Derwent abstract of KR 2002-029813 A, Derwent Acc-No. 2002-641317, attached as a PDF.*

(Continued)

*Primary Examiner* — Harold Pyon
*Assistant Examiner* — Katie L Hammer
(74) *Attorney, Agent, or Firm* — Antonelli, Terry, Stout & Kraus, LLP.

(57) ABSTRACT

A cathode material for a lithium secondary battery capable of stably suppressing manganese dissolution even under high temperature and voltage conditions is provided. Further, by using the cathode material for a lithium secondary battery, a lithium secondary battery excellent in a charge/discharge cycle profile at a high temperature and a secondary battery module equipped with the battery are provided. The cathode material for a lithium secondary battery comprises a lithium manganese composite oxide and a coating layer formed on the surface of the lithium manganese composite oxide. The coating layer includes an oxide compound or a fluoride compound each containing M (wherein, M is at least one element selected from the group of Mg, Al and Cu), and a phosphorous compound. An atomic density of M at the side of the lithium manganese composite oxide in the coating layer is higher than an atomic density of M at the side of a surface layer of the coating layer facing to the electrolyte.

19 Claims, 4 Drawing Sheets

(51) Int. Cl.
*H01M 4/505* (2010.01)
*H01M 4/52* (2010.01)

(56) References Cited

U.S. PATENT DOCUMENTS

2010/0173197 A1* 7/2010 Li et al. .................. 429/220
2011/0020708 A1  1/2011 Fujiki et al.

FOREIGN PATENT DOCUMENTS

| JP | 3142522 | 12/2000 |
| JP | 3944899 | 4/2007 |
| JP | 2008-536285 | 9/2008 |
| JP | 2011-028976 | 2/2011 |
| KR | 2002029813 A * | 4/2002 |
| WO | WO 2006/109930 A1 | 10/2006 |

OTHER PUBLICATIONS

Cho et al. English text machine translation of KR 2002-029813 A, translated by KIPO, pp. 1-8, attached as PDF.*
Chinese Notice of Rejections dated Apr. 28, 2013 of Chinese App. No. 201110048750.2 with English translation.
Notice of Reasons for Rejection of Appln. No. 2010-048597 dated Aug. 21, 2012 with English translation.
U.S. Office Action mailed May 30, 2014, in connection with U.S. Appl. No. 13/195,881; 15 pages; U.S. Patent and Trademark Office; Alexandria, Virginia; USA.

* cited by examiner

CATHODE MATERIAL FOR LITHIUM SECONDARY BATTERY, LITHIUM SECONDARY BATTERY, AND SECONDARY BATTERY MODULE USING THE BATTERY

CROSS REFERENCE TO RELATED APPLICATIONS

This application claims the foreign priority benefit under Title 35, United State Code, 119 (a)-(d) of Japanese Patent Application No. 2010-048597, filed on Mar. 5, 2010 in the Japan Patent Office, the disclosure of which is herein incorporated by reference in its entirety.

BACKGROUND OF THE INVENTION

1. Field of the Invention

The present invention relates to a cathode material for a lithium secondary battery using a lithium composite oxide as a cathode active material, a lithium secondary battery, and a secondary battery module using the battery.

2. Description of Related Art

A lithium secondary battery using a lithium ion has a higher energy density per volume and weight than other secondary batteries due to a large ionization tendency and small atomic weight of lithium. Accordingly, the lithium secondary battery is widely used as a power source of portable consumer equipment such as a cell phone, a notebook-sized personal computer, and PDA (personal digital assistant).

Further, in future, such a lithium secondary battery is expected to be used as a power source for a large sized application, for example, a motor driven electric automobile capable of suppressing a $CO_2$ emission under the environmental consideration, a hybrid vehicle driven by a motor and an engine, and a power storage system of reproducible energies such as solar light and wind power generators.

As mentioned above, such a large sized lithium secondary battery is strongly demanded to be more inexpensive and have a longer life cycle than a power source of general consumer equipment.

Currently, lithium cobalt oxide ($LiCoO_2$) is mainly used as a cathode material of the lithium secondary battery. However, lithium cobalt oxide is produced using cobalt as a material of which production quantity is small, resulting in a high price thereof. Accordingly, it is difficult to lower the cost of the battery when lithium cobalt oxide is used therein. Further, when the battery using lithium cobalt oxide is kept under high voltage conditions, cobalt dissolves from lithium cobalt oxide, thereby to cause a remarkable decrease in the battery life cycle and relate to an environmental regulation (for example, toxicity).

In view of the above, the use of nickel, iron and manganese is investigated as a substitute metal of cobalt in order to lower the cost of a battery and elongate the life cycle thereof. For example, lithium nickel oxide ($LiNiO_2$) using nickel has advantages excellent in being produced at a lower cost with a higher capacity and a superior toxicity/safety profile than lithium cobalt oxide. However, a cathode material using $LiNiO_2$ has an inferior safety profile at overcharging and is remarkable decreasing the capacity during a charge/discharge cycle.

Hereby, it is possible to improve a safety profile of a cathode material by partially substituting nickel with other elements, while the safety and capacity profiles of such a cathode material are still insufficient compared to the cathode material using lithium cobalt oxide. Accordingly, the above mentioned cathode material with a substitute element is not suitable for the large sized application.

Recently, it has been paid much attention to the use of ion as lithium iron oxide ($LiFePO_4$) with an orthorhombic olivine structure. Herein, $LiFePO_4$ has advantages that it can be produced at a low cost and excellent in a safety profile, while the conductivity thereof is very low compared to that of $LiCoO_2$. Further, the operation voltage of 3.4V thereof is 0.2 to 0.6V lower than that of other cathode materials, which decreases the energy density thereof.

In contrast, when a lithium manganese composite oxide is used, the price of a manganese compound used as a material is 10% or less of that of a cobalt compound, allowing the production at a low cost. Further, the electron conductivity thereof is about 10 times higher than that of lithium cobalt oxide. Accordingly, a low energy loss and a long life cycle of the lithium manganese composite oxide can be expected due to the excellent conductivity thereof.

Further, when the lithium manganese composite oxide is used, the amount of oxygen released in heat generation of a battery is decreased compared to the amount of oxygen when lithium cobalt oxide is used, which is excellent in the safety profile. Therefore, the lithium manganese composite oxide is expected to be a very promising material for producing a large sized lithium secondary battery.

However, when the lithium manganese composite oxide is used in a battery, manganese dissolves into an electrolyte solution when kept at a high temperature. The dissolved manganese may cause clogging of a separator arranged between a cathode and an anode, or form a coating film of a manganese compound on the anode. This may increase a resistance of the battery and decrease a durability profile thereof, resulting in the most important factor for improving the manganese Spinel type cathode.

Herein, the manganese dissolution from the lithium manganese composite oxide is caused because of the Jahn-Teller effect on trivalent manganese (that is, a non-symmetrical structure is more stable).

Here, the lithium manganese composite oxide is represented by $LiMn_2O_4$ as a stoichiometric composition. Since the valence of Li is 1 and the valence of O is $-2$, respectively, the average valence of Mn is 3.5 to satisfy the electrically neutral condition. Hereby, it is considered that about 50% of manganese in the particle of the composite oxide exists as trivalent manganese. Trivalent manganese is converted to more stable bivalent manganese and tetravalent manganese when trivalent manganese becomes energetically unstable, which causes the dissolution of bivalent manganese as an ion form. Therefore, in order to prevent the manganese dissolution, it is needed to decrease the rate of trivalent manganese, or avoid conditions in which trivalent manganese becomes energetically unstable. Herein, it is considered that manganese in a cathode material contacts to an acid component such as hydrogen fluoride (HF) contained in the electrolyte solution in which the cathode is immersed. This contact may make trivalent manganese energetically unstable.

Here, Japanese Patent Publication No. 3142522 describes that a cycle profile is improved by substituting a part of manganese sites of $LiMn_2O_4$ having a Spinel structure with lithium or transition metal in order to decrease the rate of trivalent manganese contained in a cathode material. When a part of manganese is substituted by the element having the valence of 3 or less, the average valence of manganese contained in the cathode material increases to satisfy the electric neutral condition, resulting in a decrease of the rate of the trivalent manganese. However, it is impossible to control the valence of manganese near the surface of the cathode only by substituting the element. Thus, such a substitution is insufficient to suppress the manganese dissolution from the surface of the cathode material. Further, the increase of the average valence of manganese decreases the capacity.

According to Japanese Patent Publication No. 3944899 and Japanese Laid-Open Patent Publication No. 2008-536285, a coating compound is arranged on the surface of a lithium manganese composite oxide so as to prevent a cathode material from contacting to an acid component contained in an electrolyte solution, whereby the manganese dissolution is suppressed.

Further, Japanese Patent Publication No. 3944899 discloses that a lithium manganese composite oxide is coated with a metal oxide or a metal sulfide. However, this treatment is insufficient to improve the durability profile because the lower conductivity of the coating material than the lithium manganese composite oxide increases the resistance of the coated composite oxide.

On the other hand, Japanese Laid-Open Patent Publication No. 2008-536285 discloses that a lithium compound is deposited on the surface of lithium nickel cobalt manganese oxide. However, when the lithium compound is deposited discretely, manganese dissolves from an area where no lithium compound is deposited. Accordingly, the treatment is insufficient to suppress the manganese dissolution. When a metal oxide is further coated on the surface on which a lithium compound is deposited, this coating may decrease the conductivity because the resistance also increases along with the coating.

SUMMARY OF THE INVENTION

In view of the above mentioned profiles of the compounds used for coating a lithium manganese composite oxide, an object of the present invention is to provide a cathode material for a lithium secondary battery capable of stably suppressing manganese dissolution even under high temperature and voltage conditions, by optimizing the arrangement of a coating compound to improve the coating effect. Further, another object of the present invention is to provide a lithium secondary battery excellent in a charge/discharge cycle profile at a high temperature by using the above mentioned cathode material for a lithium secondary battery, and a secondary battery module equipped with the battery.

In order to achieve the above mentioned objects, in a first aspect, the present invention provides a cathode material for a lithium secondary battery, comprising a coating layer including an oxide compound or a fluoride compound each containing M (M is at least one element selected from the group of Mg, Al and Cu), and a phosphorous compound on the surface of the lithium manganese composite oxide. Herein, in the coating layer, an atomic density of M present at the side of the lithium manganese composite oxide is higher than an atomic density of M present at the surface layer side of the coating layer. Note the surface layer side of the coating layer is referred to "surface layer side (or electrolyte side)", because the surface layer side of the coating layer faces to an electrolyte when the coating layer is immersed in the electrolyte.

In a second aspect, a lithium secondary battery of the present invention includes the cathode for a second lithium battery described in the first aspect of the present invention.

In a third aspect, a lithium secondary battery module of the present invention comprises a plurality of the lithium secondary batteries described in the second aspect electrically connected each other, and a controller which detects a voltage between terminals of the plurality of the batteries and controls the conditions of the plurality of the lithium secondary batteries.

In a fourth aspect, a lithium secondary battery module of the present invention comprises a plurality of batteries electrically connected each other, a controller which manages and controls the conditions of the plurality of the batteries. Herein, the controller detects a voltage between terminals of the plurality of the batteries. Further, in each of the plurality of the batteries, is formed a layered body comprising a cathode, an anode and an electrolyte, and housed in a battery can as an outer package of each battery. The cathode is made of a lithium manganese composite oxide, comprising a coating layer including an oxide compound or a fluoride compound each containing M (M is at least one element selected from the group of Mg, Al and Cu), and a phosphorous compound on the surface of the lithium manganese composite oxide. Herein, in the coating layer, the atomic density of M present at the side of the lithium manganese composite oxide is higher than the atomic density of M present at the surface layer side (or electrolyte side) of the coating layer.

According to the present invention, a cathode material for a lithium secondary battery capable of stably suppressing manganese dissolution even under high temperature and high voltage conditions can be realized. Further, by using the cathode material for a lithium secondary battery, a lithium secondary battery excellent in high temperature charge/discharge cycle profile, and a secondary battery module using the battery can be realized.

DETAILED DESCRIPTION OF THE PREFERRED EMBODIMENT

Figure 1:
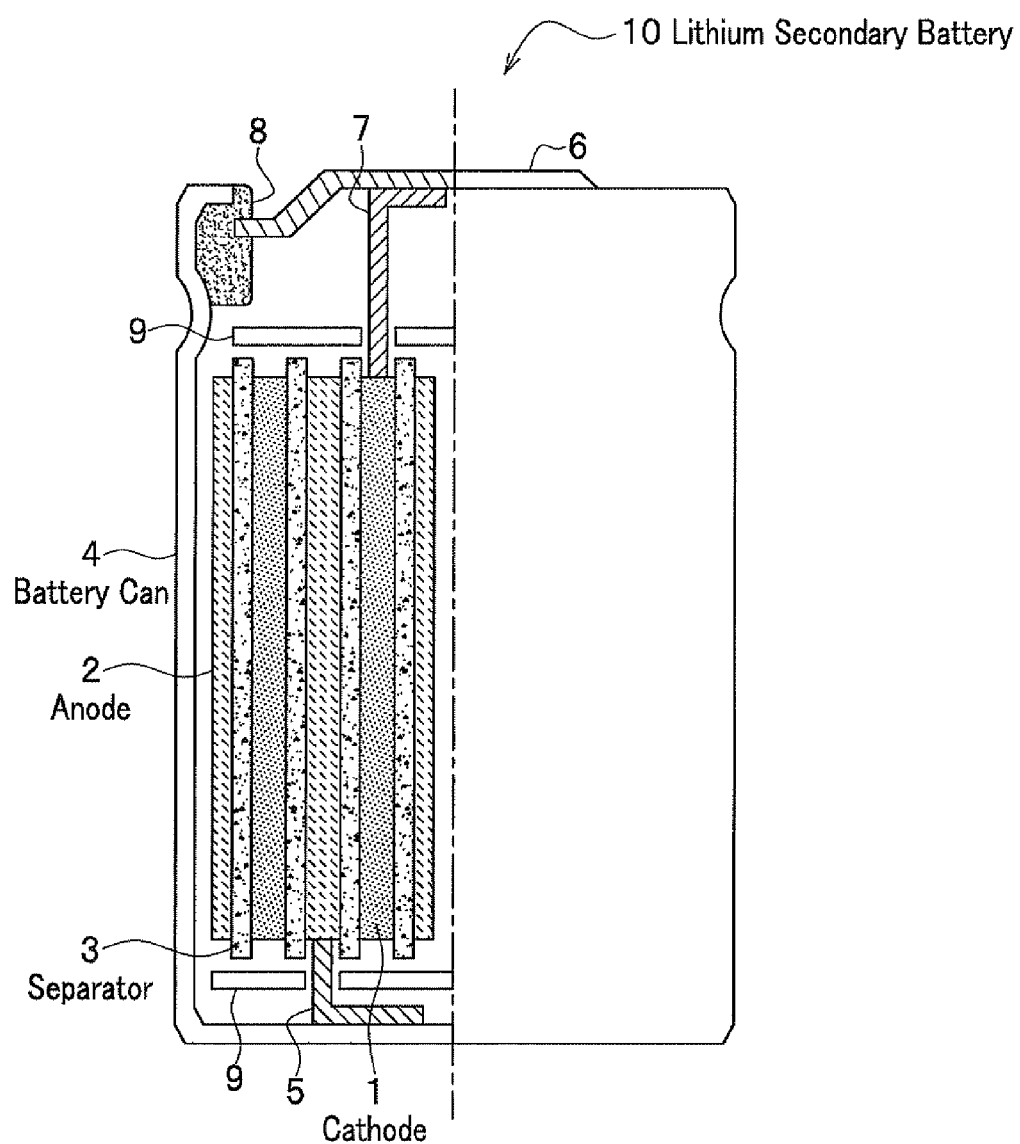
FIG. 1 is a schematic longitudinal cross-sectional diagram showing a lithium secondary battery in an embodiment of the present invention.

Hereinafter, the present invention will be described in more detail by showing embodiments of the cathode material for a lithium secondary battery, the lithium secondary battery and the secondary battery module.

The cathode material for a lithium secondary battery of the present invention comprises a coating layer including an oxide compound or a fluoride compound each containing M (M is at least one element selected from the group of Mg, Al and Cu), and a phosphorous compound on the surface of the lithium manganese composite oxide ($LiMn_2O_4$) used as a cathode active material. Herein, in the coating layer, the atomic density of M present at the side of the lithium manganese composite oxide is higher than the atomic density of M present at the surface layer side (or electrolyte side) of the coating layer. The formation of the coating layer can prevent manganese in the lithium manganese composite oxide used as a cathode active material from dissolving into the electrolyte (or electrolyte solution).

The lithium secondary battery of the present invention has a structure in which a cathode having a lithium-ion (Li$^+$) intercalation/de-intercalation ability and an anode having a lithium-ion (Li$^+$) intercalation/de-intercalation ability are assembled via an electrolyte. The cathode is made of a lithium manganese composite oxide, and comprises a coating layer including an oxide compound or a fluoride compound each containing M (M is at least one element selected from the group of Mg, Al and Cu), and a phosphorous compound on the surface of the lithium manganese composite oxide. Herein, in the coating layer, the atomic density of M present at the side of the lithium manganese composite oxide is higher than the atomic density of M present at the surface layer side (or electrolyte side) of the coating layer.

Preferably, the lithium manganese composite oxide has a cubic Spinel structure and represented by the general formula of LiMn$_x$N$_{2-x}$O$_4$ (wherein 1.7≤x≤1.95; N is at least one element selected from the group of Li, Mg, Al and Ni).

Further, the content of the oxide compound or the fluoride compound each forming the coating layer and containing M is preferably in the range from 0.1 wt % or more to 3.0 wt % or less with respect to the lithium manganese composite oxide (wherein the content of the lithium manganese composite oxide is 100 wt %).

Moreover, the phosphorous compound forming the coating layer is preferably at least one compound selected from the group of Li$_3$PO$_4$, Li$_4$P$_2$O$_7$ and LiPO$_3$. Herein, the content of the phosphorous compound is preferably in the range from 0.1 wt % or more to 5.0 wt % or less with respect to the lithium transition metal composite oxide (wherein the content of the lithium transition metal composite oxide is 100 wt %).

Furthermore, preferably the thickness of the coating layer is in the range from 4 nm or more to 100 nm or less, which is formed on the surface of the lithium manganese composite oxide (LiMn$_2$O$_4$) used as a cathode active material.

The lithium secondary battery of the present invention has a capacity retention rate of 70% or more, after 1000 cycles of charging/discharging operation are conducted in the range from 2.7V or more to 4.2V or less, at a charge/discharge rate of 0.5 C at 50° C.

Herein, "a charge/discharge rate of 1 C" means a current rate so that 100% of charge is completed within one hour when a battery is charged from a completely discharged state and 100% of discharge is completed within one hour when a battery is discharged from a completely charged state. In other words, charging or discharging is performed in a rate of 100% per one hour. Therefore, a rate of 0.5 C means a rate of 100% per two hours, that is, 100% of charging or discharging is completed within two hours. Herein, 1 cycle is composed of 1 charging and 1 discharging operations.

The lithium secondary battery module of the present invention comprises a plurality of batteries electrically connected each other, a controller which manages and controls the conditions of the plurality of the batteries. Herein, the controller detects a voltage between terminals of each of the plurality of the batteries. Further, in each of the plurality of the batteries, is formed a layered body comprising a cathode, an anode and an electrolyte, and housed in a battery can as an outer package of each battery. The cathode is made of lithium manganese composite oxide, comprising a coating layer including an oxide compound or a fluoride compound each containing M (M is at least one element selected from the group of Mg, Al and Cu), and a phosphorous compound on the surface of the lithium manganese composite oxide. Herein, in the coating layer, the atomic density of M present at the side of the lithium manganese composite oxide is higher than the atomic density of M present at the surface layer side (or electrolyte side) of the coating layer.

Next, one embodiment for carrying out the present invention will be described in more detail.

FIG. 1 is a longitudinal cross-sectional diagram schematically showing a lithium secondary battery 10 (or 18650-type lithium-ion secondary battery).

The lithium secondary battery 10 comprises a cathode 1, an anode 2, and a separator 3 which is placed between the cathode 1 and the anode 2 to prevent the contact each other. The separator 3 has an ion conductivity and is made of a microporous thin film or the like. The cathode 1, the anode 2 and the separator 3 are stacked and spirally wound to be housed in a battery can 4 made of stainless steel or aluminum with a non-aqueous electrolyte using an organic solvent.

In the cathode 1, a cathode lead 7 for extracting a current is formed, while in an anode 2, an anode lead 5 is formed for extracting a current. This construction allows the currents generated from the cathode 1 and the anode 2 to be extracted by the cathode lead 7 at the cathode side and the anode lead 5 at the anode side, respectively.

Herein, insulation plates 9 are placed between the cathode 1 and the anode lead 5, and between the anode 2 and the cathode lead 7, respectively, to prevent short-circuit. The insulation plate 9 is made of epoxy resin or the like having an insulating property. Further, a packing (or sealing material) 8 made of rubber with an electric insulating property is placed between the battery can 4 contacting to the anode lead 5 and the cap 6 contacting to the cathode lead 7, so as to prevent leakage of the electrolyte solution and separate the cathode 1 (or positive electrode) from the anode 2 (or negative electrode).

<Cathode 1>

The cathode 1 is produced by applying a cathode mix to the current collector, with a thickness of about 100 μm per one side thereof. The current collector is made of a metal foil (for example, aluminum foil with a thickness between 5 μm and 25 μm or copper foil with a thickness about 10 μm). The cathode mix comprises an active material contributing to lithium intercalation/de-intercalation as described hereinafter, a conductive material increasing the conductivity of the cathode 1, and a binder such as PVdF (PolyVinylidene diFluoride) securing an adhesion property with the current collector.

<Anode 2>

The anode 2 is produced by applying an anode mix to the current collector, with a thickness of about 100 μm per one side thereof. The current collector is made of a metal foil (for example, a copper foil with a thickness between 7 μm and 20 μm). The anode mix comprises an active material, a conductive material, and a binder. The active material of the anode 2 may include metallic lithium, a carbon material, and a material to which lithium can be inserted or a material which can form a compound with lithium. Herein, a carbon material is the most preferable material. The carbon material includes graphite materials such as natural graphite and artificial graphite, and amorphous carbon materials such as carbide of coal based coke and pitch, carbide of petroleum based coke and pitch, and carbide of pitch coke or the like.

Preferably, a variety of surface treatments may be conducted for the above mentioned carbon materials. The carbon material can be used as a single material or combination of two materials or more.

A material to which lithium-ion (Li$^+$) can be inserted or a material which can form a compound with lithium-ion (Li$^+$)

may include a metal such as aluminum, tin, silicon, indium, gallium and magnesium, an alloy containing the metallic elements, and a metal oxide containing tin or silicon. Further, such a material may include a composite material made of the above mentioned metal, alloy, metal oxide materials and the carbon materials such as graphite and amorphous carbon.

<Coating Layer for Coating Lithium Manganese Composite Oxide of Cathode 1>

The active material of the cathode 1 is preferably comprises a coating layer including an oxide compound or a fluoride compound each containing M (M is at least one element selected from the group of Mg, Al and Cu), and a phosphorous compound on the surface of the lithium manganese composite oxide ($LiMn_2O_4$) (hereinafter, referred to "composite oxide"). Herein, in the coating layer coating the surface of the composite oxide, preferably the atomic density of M present at the side of the composite oxide is higher than the atomic density of M present at the surface layer side (or electrolyte side) of the coating layer.

Here, the elements included in the coating layer are Mg, Al and Cu. By using the elements, it is possible to selectively arrange M near the complex oxide in the coating layer. The oxide compound or fluoride compound each containing M can be stably present against HF (hydrogen fluoride) in the electrolyte solution. As a result, the coating layer can prevent the composite oxide from contacting to HF, thereby to suppress manganese dissolution. Further, the conductivity of the metal oxide (oxide compound containing M) or the metal fluoride (fluoride compound containing M) is very low, which results in the increase of the resistance of the cathode 1 when used alone.

However, the increase of the resistance of the cathode 1 can be suppressed by including a phosphorous compound having preferable conductivity (for example, one or more compounds selected from the group of $Li_3PO_4$, $Li_4P_2O_7$ and $LiPO_3$) in the cathode 1.

The phosphorous compound not only has conductivity but prevents oxidative decomposition of the electrolyte solution under high voltage conditions. Accordingly, the phosphorous compound is arranged in a different manner from the oxide compound or the fluoride compound each containing M. Hereby, in the coating layer, preferably the atomic density of phosphor of the phosphorous compound present at the surface layer side (or electrolyte side) near the electrolyte solution (or electrolyte) is higher than the atomic density of phosphor in the coating layer present at the side of the composite oxide.

Here, the distribution of the elements in the coating layer is represented as follows. The coating layer is divided equally to 2 parts in a thickness direction, that is, the length from one interface of the coating layer at the complex oxide side to the other interface of the coating layer at the electrolyte solution side (or electrolyte) is equally divided into 2 parts. Herein, an interface side close to the complex oxide composing the cathode material is referred to a composite oxide side, while an interface side close to the electrolyte solution (or electrolyte) is referred to a surface side (or electrolyte side). An atomic density of an element is represented by the average atomic density in each divided part. When the atomic density of an element at the composite oxide side is higher in 4 atom % or more than the atomic density of the element at the surface side (or electrolyte side), it is defined that the atomic density is higher, considering the measurement error or the like.

Preferably, the phosphorous compound composing the coating layer is at least one compound selected from the group of $Li_3PO_4$, $Li_4P_2O_7$ and $LiPO_3$, in view of the above mentioned profiles such as good conductivity, HF resistance and suppressing ability of oxidative decomposition of the electrolyte solution.

As a composite oxide of the cathode active material, it is preferable to use a compound represented by the formula: $LiMn_xN_{2-x}O_4$ (wherein, $1.7 \leq x \leq 1.95$; N is at least one element selected from the group of Li, Mg, Al and Ni). $LiMn_xN_{2-x}O_4$ has a cubic Spinel structure, in which a diffusion pathway of lithium is a three dimensional space formed between crystalline lattices. In contrast, in the compound having a layered structure such as $LiCoO_2$, a diffusion pathway of lithium is a two dimensional plane formed between layers. Further, in the compound having an orthorhombic olivine structure represented by $LiFePO_4$, a diffusion pathway of lithium is one dimensional formed between crystalline lattices. Accordingly, $LiMn_xN_{2-x}O_4$ has higher Li conductivity than other above mentioned compounds because the diffusion pathway of lithium therein is three dimensional.

Meanwhile, it is known that in a cathode material with a Spinel structure, a diffusion pathway of lithium is inhibited by site (or position) substitution between lithium and manganese, resulting in a decrease of the conductivity of lithium-ion ($Li^+$). Further, such a material has another property that trivalent manganese is likely to dissolving into an electrolyte solution.

Therefore, a method has been developed for preventing the site substitution between lithium and manganese and decreasing the rate of trivalent manganese by increasing the average valence of manganese. In the method, the manganese site is partially substituted by a different kind of metal having the valence of 3 or less. As a result, the average valence of manganese increases to satisfy the electrical neutral condition, allowing the rate of trivalent manganese to be decreased. As mentioned above, the occupational rate of manganese in the lithium diffusion pathway can be decreased by decreasing the rate of manganese.

In the case of $LiMn_2O_4$, the average valence of manganese is 3.5 to satisfy the electric neutral condition because a valence of lithium is 1 and a valence of oxygen is −2. Herein, if a part of manganese is substituted by a different kind of metal having a valence of 3 or less, it is possible to increase the average valence of manganese based on the electric neutral condition. According to the present invention, it is possible to decrease the rate of trivalent manganese without decreasing the lithium diffusion ability by using monovalent lithium, bivalent magnesium and nickel, and trivalent aluminum as a substituent element.

Here, the content "x" of manganese in the cathode material is in the range of $1.7 \leq x \leq 1.95$. When "x" has a value less than 1.7, the amount of manganese contributing to lithium intercalation/de-intercalation is decreased, which results in lowering the battery capacity. In contrast, when "x" has a value more than 1.95, manganese dissolution is likely to occur, which results in lowering the battery durability. Accordingly, more preferably, "x" is set in the range of $1.8 \leq x \leq 1.9$.

Here, the stoichiometric composition rate of oxygen (O) in $LiMn_2O_4$ is defined by a value of 4. However, it is known that the value may be shifted from the stoichiometric composition rate associated with the sintering conditions of the compound. Therefore, about 5% shift of the stoichiometric composition rate of oxygen is allowable without departing from the principle of the present invention.

In order to suppress the manganese dissolution from the composite oxide, the contents of the coating compounds composing the coating layer are also important in addition to the arrangement of the coating compounds (or coating layer) for coating the composite oxide and the composition of the composite oxide.

The content of the oxide compound or the fluoride compound, each forming the coating layer and containing M (wherein, M is at least one element selected from the group of Mg, Al and Cu) included in the coating compounds, is preferably in the range from 0.1 wt % or more to 3.0 wt % or less with respect to the composite oxide (in the case where the content of the composite oxide is 100 wt %).

Note that the oxide compound or the fluoride compound each containing M prevents the composite oxide from contacting to HF in the electrolyte solution. Therefore, preferably, the entire surface of the composite oxide is coated with the coating compound to separate the composite oxide from the electrolyte solution containing HF. When the content of the coating compound is less than 0.1 wt %, this small content is insufficient to coat the surface of the composite oxide. In contrast, when the content of the coating compound is more than 3.0 wt %, this large content increases the cathode resistance and energy loss because the oxide compound or the fluoride compound each containing M is an insulator, which results in a remarkable decrease of the battery capacity. Accordingly, more preferably, the content of the coating compound is set in the range from 0.3 wt % or more to 1.5 wt % or less.

The content of the phosphorous compound composing the coating compounds (or coating layer) is preferably in the range from 0.1 wt % or more to 5.0 wt % or less with respect to the composite oxide used as a the cathode active material (wherein the content of the composite oxide is 100 wt %).

The phosphorous compound in the coating layer works as a conductive aid and suppresses the oxidative decomposition of the electrolyte solution. Herein, when the content of the phosphorous compound is less than 0.1 wt %, this small content is insufficient to complement the decrease of the conductivity and suppress the oxidative decomposition of the electrolyte solution. In contrast, when the content of the phosphorous compound is more than 5.0 wt %, this large content results in the decrease of the battery capacity because the phosphorous compound itself does not contribute to the charge/discharge reaction. Accordingly, more preferably, the content the phosphorous compound is set in the range from 0.5 wt % or more to 2.0 wt % or less.

Further, the coating layer coating the composite oxide has a thickness preferably is in the range from 4 nm or more to 100 nm or less. When the thickness of the coating layer is less than 4 nm, it is needed to set a particle diameter of the coating compound smaller than the thickness. In this case, particles of the coating compounds composing the coating layer are agglomerated by the van der Waals force, whereby it is difficult to uniformly cover the surface of the composite oxide. In contrast, when the thickness of the coating layer is more than 100 nm, the increase of the resistance is more significant than the suppressing effect on the manganese dissolution into the electrolyte solution, which results in an increase of the energy loss and a decrease of the battery characteristics. Accordingly, more preferably, the thickness of the coating layer is set in the range from 10 nm or more to 60 nm or less.

<Surface Coating Treatment of Composite Oxide by Coating Layer>

Here, a surface coating treatment is needed to arrange coating compounds (or coating layer) on the surface of the composite oxide. The coating compound of the present invention includes an oxide compound or a fluoride compound each containing M (wherein, M is at least one element selected from the group of Mg, Al and Cu), and a phosphorous compound. Herein, with respect to M in the coating compound, it is needed that in the coating layer coating the surface of the composite oxide, the atomic density of M present at the side of the composite oxide is higher than the atomic density of M present at the surface layer side (or electrolyte side) of the coating layer. Therefore, the procedure of the coating treatment for the composite oxide is important.

The process for treating the surface of the composite oxide is largely classified in a solid phase method and a liquid phase method. Herein, the liquid phase method is more preferable. In the solid phase method, it is difficult to uniformly disperse the coating compounds (or coating layer) on the surface of the composite oxide. Further, physical damages may be caused on the surface of the composite oxide associated with the coating treatment in the solid phase method. In contrast, the liquid phase method has the following advantages. That is, it is possible to uniformly coat the surface of the composite oxide and control the particle diameter in the coating layer. Further, the possibility causing the physical damages on the surface of the composite oxide is small.

The composite oxide was coated in the following procedure so as to increase the atomic density of M in the coating layer present near the composite oxide (wherein, M is at least one element selected from the group of Mg, Al and Cu).

First, a hydroxide compound containing M and a phosphorous compound were mixed in a solvent. Then, the composite oxide was added to the solvent containing the hydroxide compound and the phosphorous compound, and mixed at room temperature. In the mixing procedure as mentioned above, the phosphorous compound was dispersed and mixed with the hydroxide compound containing water molecules. In this state, the coating compounds (or coating layer) adhered to the surface of the composite oxide. Herein, the hydroxide compound with a hydroxyl group has high wettability to sufficiently adhere to the surface of the composite oxide. The resultant mixture was dried in vacuo or spray-dried to evaporate the solvent. The powder thus obtained was heated in the atmosphere to convert the hydroxide compound containing M into the oxide compound containing M.

Alternatively, when the powder thus obtained was heated in a fluorine gas, the hydroxide compound containing M was converted into the fluoride compound containing M.

The above mentioned treatments allow the atomic density of M present near the composite oxide to be increased (wherein, M is at least one element selected from the group of Mg, Al and Cu). On the other hand, the phosphorous compound has lower wettability than the hydroxide compound and the atomic density of M is high near the composite oxide. Accordingly, the atomic density of phosphor at the surface layer side (or electrolyte side) is higher than the atomic density of phosphor present near the composite oxide (or at the composite oxide side).

Here, the cathode material for a lithium secondary battery of the present invention may be used alone. The cathode material comprises a coating layer including an oxide compound or a fluoride compound each containing M (M is at least one element selected from the group of Mg, Al and Cu), and a phosphorous compound on the surface of the composite oxide. Herein, in the coating layer, the atomic density of M present at the side of the composite oxide (or the lithium manganese composite oxide) is higher than the atomic density of M present at the surface layer side (or electrolyte side) of the coating layer. Alternatively the cathode material for a lithium secondary battery of the present invention may be used by mixing with a non-coated composite oxide or a cathode material having a layered structure or an olivine structure.

The lithium secondary battery of the present invention has a capacity retention rate of 70% or more, more preferably 75% or more, after 1000 cycles of charging/discharging were conducted in the range from 2.7V or more to 4.2V or less at a charge/discharge rate of 0.5 C at 50° C.

Herein, as described previously, "a charge/discharge rate of 1 C" means a current rate so that 100% of charge is completed within one hour when a battery is charged from a completely discharged state and that 100% of discharge is completed within one hour when a battery is discharged from a completely charged state. In other words, charging or discharging is performed in a rate of 100% per one hour. For example, a charge/discharge rate of 0.5 C means a rate of 100% per two hours, that is, 100% of charging or discharging is completed within two hours.

<Preparation of Composite Oxide>

Next, a method for preparing a composite oxide (or lithium manganese composite oxide) will be described in detail.

As a material for the composite oxide, the following materials can be used.

The lithium compound includes lithium carbonate ($Li_2CO_3$) lithium hydroxide (LiOH), lithium nitrate ($LiNO_3$), lithium acetate ($CH_3CO_2Li$) lithium chloride (LiCl), and lithium sulfate ($Li_2SO_4$) or the like. Herein, lithium carbonate ($Li_2CO_3$) and lithium hydroxide (LiOH) are used preferably.

The manganese compound includes manganese hydroxide ($Mn(OH)_3$), manganese carbonate ($Mn_2(CO_3)_3$), manganese nitrate ($Mn(NO_3)_3$), manganese acetate ($Mn(CH_3CO_2)_3$), manganese sulfate ($Mn_2(SO_4)_3$), and manganese oxide (MnO) or the like. Herein, manganese carbonate ($Mn_2(CO_3)_3$) and manganese oxide (MnO) are used preferably. The compound used for substituting element M includes hydroxide, carbonate, nitrate, acetate, sulfate and oxide or the like.

The raw materials were supplied as powder with a predetermined composition rate, and ground and mixed by mechanically means such as a ball mill. The grinding and mixing process may be conducted by either of dry or wet milling. Then, the powder thus obtained was fired at 700° C. or more to 1000° C. or less, preferably at 800° C. or more to 900° C. or less, for 4 to 48 hr, preferably for 10 to 24 hr. Herein, the firing is conducted preferably in an atmosphere containing an oxygen gas ($O_2$) such as oxygen or air. After the firing, the resultant mixture may be air cooled, gradually cooled in an atmosphere of inert gas (such as nitrogen or argon gas), or rapidly cooled using liquid nitrogen. Further, the firing may be conducted repeatedly two times or more.

By using the method as mentioned above, the oxygen deficiency caused on the surface of the composite oxide can be suppressed. The average secondary particle diameter of the powder obtained after the firing is preferably 3 μm or more to 30 μm or less. When the average secondary particle diameter is less than 3 μm, the specific surface area is so large as to increase the contacting area between the electrolyte solution and the composite oxide, facilitating the manganese dissolution. In contrast, when the average secondary particle diameter is more than 30 μm, the Li diffusion pathway in the composite oxide is elongated, which is not preferable for the lithium intercalation/de-intercalation performance. Therefore, the average secondary particle diameter is preferably set in the range from 5 μm to 25 μm.

Next, a surface treatment was conducted by using the composite oxide thus obtained.

<Method for Surface Treatment of Composite Oxide>

Hereinafter, a surface treatment method for treating the composite oxide (or lithium manganese composite oxide) using a liquid phase method will be described in detail.

First, a predetermined amount of a metal salt such as nitrate, acetate or sulfate each containing a metal element selected from the group of Mg, Al and Cu, was dissolved in water or an organic solvent. Then, as a material of the phosphorous compound, a predetermined amount of ammonium phosphorous dibasic ($(NH_4)_2HPO_4$) or ammonium dihydrogen phosphate ($NH_4H_2PO_4$) was dissolved in the above mentioned solution.

Then, a pH value of the solvent was adjusted by a pH adjustment agent to have the pH value of the solvent equal to that of the composite oxide (or lithium manganese composite oxide). Herein, the pH value of the composite oxide is obtained by measuring a pH value of supernatant of a suspension which is prepared by adding the composite oxide (10 g) in purified water (100 ml), stirring the mixture at room temperature for 10 min, and left for 20 min. The pH value of the composite oxide is varied depending on the composition thereof, and almost falls in the range between pH8 and pH11.

As a pH adjustment agent, lithium hydroxide (LiOH) or ammonium ($NH_3$) water each having basicity can be used. However, lithium hydroxide (LiOH) is used more preferably to form a phosphorous compound. By using lithium hydroxide, the pH value of the solvent was adjusted in the range between about ±0.5 of the pH values of the oxide composite, whereby the solution was made basic. Accordingly, a material of the metal element (that is, a metal salt of nitrate, acetate or sulfate containing at least one metal element selected from the group of Mg, Al and Cu) was converted to a corresponding metal hydroxide and precipitated. Further, a material of the phosphorous compound such as ammonium phosphorous dibasic ($(NH_4)_2HPO_4$) or ammonium dihydrogen phosphate ($NH_4H_2PO_4$) was converted to a corresponding phosphate compound and precipitated. For example, the conversion reactions are represented as follows.

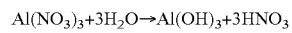

$$Al(NO_3)_3 + 3H_2O \rightarrow Al(OH)_3 + 3HNO_3$$

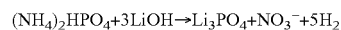

$$(NH_4)_2HPO_4 + 3LiOH \rightarrow Li_3PO_4 + NO_3^- + 5H_2$$

To the solvent thus prepared, was added the above mentioned cathode material to have the coating compound adhere to the surface the cathode material. Then, the solvent was evaporated. Preferably, the evaporation was conducted by heating/stirring or spray-drying. Finally, the powder thus obtained was heated at 300° C. or more to 800° C. or less, more preferably, at 500° C. or more to 700° C. or less. By the heating treatment, the hydroxide compound such as $Al(OH)_3$ adhering to the surface of the composite oxide was converted to a corresponding oxide such as $Al_2O_3$, whereby a strong adhesiveness was provided between the coating compound (or coating layer) and the composite oxide. Herein, the heating time is in the range from 1 hr or more to 20 hr or less, preferably, in the range from 3 hr or more to 8 hr or less.

Alternatively, the hydroxide compound such as $Al(OH)_3$ can be converted to a corresponding fluoride compound such as $Al_2F_3$, when the heating treatment is conducted under the atmosphere of a fluorine ($F_2$) gas. For the fluorine gas, nitrogen trifluoride ($NF_3$) is preferably used.

(Analysis of Crystal Structure)

The crystal structure of the composite oxide (or lithium manganese composite oxide) thus prepared was analyzed by Automated X-Ray Diffractometer (Rigaku, RINT-Ultima III, referred to XRD hereinafter) to measure the diffraction profile (or patterns) using a $CuK_\alpha$ line.

The crystal structure of the composite oxide was determined based on the peak angle of the diffraction profile thus obtained.

(Method for Measuring Average Particle Diameter of Cathode Material)

The average particle diameter of the cathode material was analyzed by Laser Scattering Particle Distribution Analyzer (Horiba, LA-920) using the laser scattering method described as follows. First, a dispersant was prepared by mixing 0.2 wt % sodium hexametaphosphate in pure water, and the cathode material was added. The mixture was dispersed by vibrating with a sonicator for 5 min so as to suppress the agglomeration of the materials. Then, a median diameter (that is, a particle diameter of which relative content is 50%) was measured to use the value as the average particle diameter.

(Analysis of Element Distribution in Coating Layer)

The thickness of the coating layer and the atomic density distribution in the coating layer were measured by Field Emission Transmission Electron Microscope (referred to TEM hereinafter) (Hitachi Ltd., HF-2000) equipped with Energy Dispersive x-ray Spectroscopy (referred to EDS hereinafter) (Thermo Fisher, NORAN System 300), at the acceleration voltage of 200 kV. The sample was prepared as a thin plate before the analysis by a grinder in the Ar-ion etching method.

In addition to the above mentioned spectroscopy, the element distribution in the coating layer can be analyzed by TEM-EELS combining TEM and Electron Energy-Loss Spectroscopy (EELS), Time-of-Flight Secondary Ion Mass Spectroscopy (TOF-SIMS) or Auger Electron Spectroscopy (AES).

(Analysis of Coating Compound (Coating Layer))

The binding state of the surface coating compound was analyzed by obtaining the electron diffraction image thereof using TEM (Hitachi Ltd., HF-2000) at the acceleration voltage of 200 kV. The diffraction point obtained from the image was compared to that of a known compound of which data is stored in an equipped database, thereby to identify the compound type.

(Measurement of Weight Rate of Elements)

The weight rate of the elements forming the coating layer used for the surface treatment, and the weight rate of manganese dissolved in the electrolyte solution were measured by Inductivity Coupled Plasma Atomic Emission Spectrometer (referred to ICP hereinafter) (Hitachi Ltd., P-4000). First, to ion-exchanged water (45 ml) in a beaker, were added the cathode material (5 g) and nitric acid (2 ml), or the electrolyte solution (5 ml), and the mixture was stirred for 30 min by using a stirrer and left for 5 min. The mixture was filtered through a filter paper and the resultant filtrate was sprayed with Ar gas into the high frequency atmosphere to measure the intensity of light specific for each exited element, whereby the weight rate of the respective elements was calculated.

<Method for Producing Lithium Secondary Battery>

Hereinafter, an example of the method for producing the secondary battery will be described.

A cathode material (composite oxide ($LiMn_2O_4$)) as an active material was mixed with a conductive material of carbon material powder and a binder such as poly vinylidene fluoride to prepare a slurry. The mixing rate of the conductive material to the cathode material is preferably 3 wt % or more to 10 wt % or less (when the rate of the cathode material is 100 wt %). Further, the mixing rate of the binder to the cathode material is preferably 2 wt % or more to 10 wt % or less (when the rate of the cathode material is 100 wt %).

In the mixing process, it is preferable to use a kneading machine to sufficiently knead the mixture so that the cathode material is uniformly dispersed in the slurry.

The slurry thus obtained was applied to both sides of the aluminum foil of the current collector with a thickness of 15 μm or more to 25 μm or less by using a roll transfer. After applied to both sides, the resultant product was press dried to form a cathode 1 as an electrode plate (see FIG. 1). Herein, the thickness of the mixture of the cathode material, the conductive material and the binder is preferably 200 μm or more to 250 μm or less.

Similarly to the cathode, in a method for producing an anode, an anode material was mixed with a binder and applied to a current collector. Then, the product thus obtained was pressed to form an anode. Herein, a thickness of the anode mixture is 20 μm or more to 70 μm or less. In the case of the anode, a copper foil was used as a current collector with a thickness of 7 μm or more to 20 μm or less. When the anode material was mixed with the binder and applied, the mixing rate is preferably 90:10 by weight.

After the mixture was applied, the pressed electrodes for a cathode and an anode were cut out in a predetermined length respectively to form the cathode 1 and the anode 2 as shown in FIG. 1. On the respective electrodes, a cathode lead 7 and an anode lead 5 were formed as a tab for extracting a current by spot welding or ultrasonic welding or the like. Herein, the cathode lead 7 and the anode lead 5 of the tab were made of a metal foil same as the material of the current collector with a rectangular shape. Each lead is a member arranged for extracting a current from each electrode. Then, a separator 3 made of a macroporous thin film having lithium-ion conductivity such as polyethylene (PE) or polypropylene (PP) was stacked between the cathode 1 and the anode 2 to which the tabs were attached. The cathode 1 and the anode 2 were wound via the separator 3 in a cylindrical shape (or spiral shape) to form a group of electrodes, and housed in a battery can 4 of a cylindrical container as shown in FIG. 1.

Alternatively, the electrode may be housed in a saclike shaped separator (not shown) and the resultant product is stacked one-by-one to form a multilayered structure, thereby to be housed in a rectangular shaped container. A material of the container is preferably made of stainless steal or aluminum. A material of stainless steal has high corrosion resistance due to the formation of a passive coating on the surface thereof. Further, a material of stainless steal has high strength enough to resist the internally increased pressure caused by the vaporized gas of the electrolyte solution in the battery can 4. A material of aluminum is a light-weight material, whereby the energy density per weight thereof is high.

The group of the electrodes (that is, cathode 1, anode 2 and separator 3) was housed in the battery can 4 of the battery container. Then, the electrolyte solution was poured in the battery can 4 and the battery can 4 was sealed with a packing 8 to complete assembling of the battery.

As an electrolyte solution, the following solutions can be used preferably. These electrolyte solutions are prepared by dissolving an electrolyte such as lithium hexafluorophosphate (LiPF6), lithium tetrafluoroborate (LiBF4), and lithium perchlorate (LiClO4) or the like, in a solvent such as diethyl carbonate (DEC), dimethyl carbonate (DMC), ethylene carbonate (EC), propylene carbonate (PC), vinylene carbonate (VC), methyl acetate (MA), ethyl methyl carbonate (EMC), and methyl propyl carbonate (MPC). Herein, the concentration of the electrolyte is preferably set in the range from 0.7M (molar) or more to 1.5M (molar) or less.

Further, to the above mentioned electrolyte solutions, a compound having a carboxylic anhydride group, a compound containing a sulfur element (S) such as propane sultone, or a compound containing a boron element (B) may be mixed. The addition of such compound provides the following advantages, for example, the suppression of the reducing decomposition of the electrolyte on the surface of the anode 2, the suppression of the reducing deposition of the metal element such as manganese dissolved from the cathode 1, the increase of the ion conductivity of the electrolyte solution, and the increase of the incombustibility of the electrolyte solution. The object of adding the compounds may be selected depending on the above mentioned properties.

Hereinafter, examples of the present invention will be described in more detail. However, the present invention is not limited to the examples.

EXAMPLE

Example 1

Table 1 shows the profiles of the cathode composite oxide prepared in Example 1.

TABLE 1

| Composite Oxide | $LiMn_xN_{2-x}O_4$ | | | Thickness Coating Layer (nm) | Atomic Density of M | | Amount of M Compound (wt %) | Amount of $Li_3PO_4$ (wt %) | Mn Dissolution (wt ppm) |
|---|---|---|---|---|---|---|---|---|---|
| | x | N | M | | Composite Oxide Side (atom %) | Surface Layer Side (atom %) | | | |
| Example 1 | 1.88 | Li, Mg | Al | 30 | 26 | 21 | 0.5 | 1 | 5 |

(Preparation of Cathode Material)

In Example 1, as a material of the composite oxide, lithium carbonate ($LiCO_3$), manganese (II, III) oxide ($Mn_3O_4$) and magnesium oxide (MgO) were used. The compounds were weighed in the material rate of Li:Mn:Mg=1.04:1.88:0.04, and mixed by a mill in a wet milling method. After drying the powder thus obtained, the powder was placed in a high purity alumina vessel and pre-sintered at 800° C. for 12 hr in the air to increase the sintering thereof, then air-cooled. Next, the pre-sintered powder was ground, placed in a high purity alumina vessel, and sintered at 850° C. for 20 hr in the air. After air-cooled, the resultant product was ground and classified.

Figure 2:
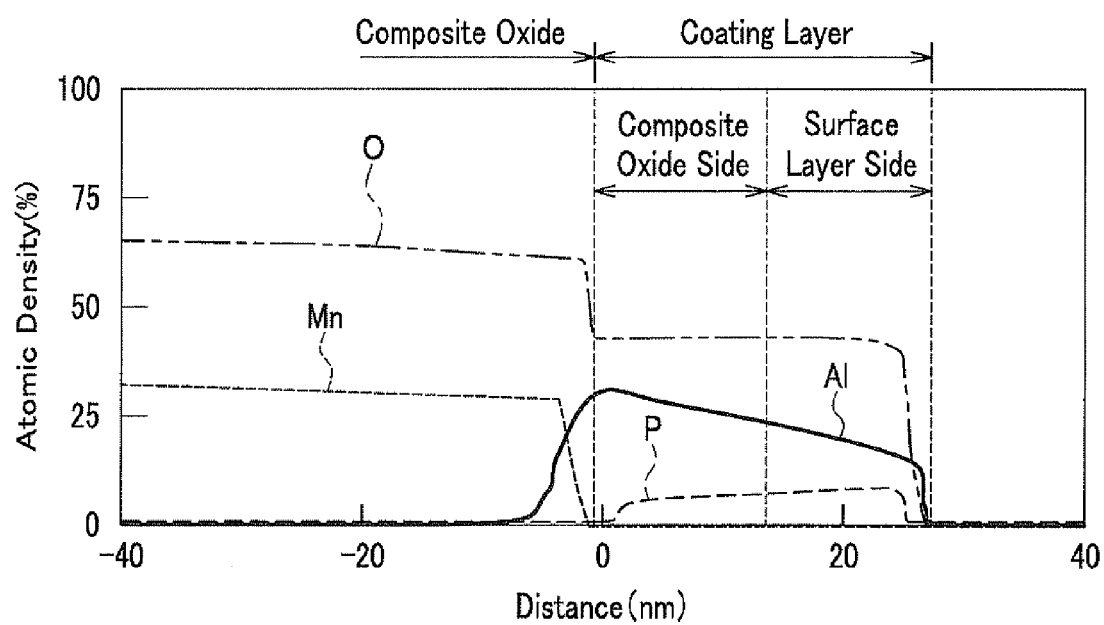
FIG. 2 is a diagram showing a distribution of the major elements around the coating layer of the cathode material in an embodiment of the present invention.

FIG. 2 shows the X-ray diffraction profile of the composite oxide thus obtained. The obtained peaks were compared to the International center for Diffraction Data card (hereinafter, referred to ICDD card) (PDF-2), whereby the composite oxide was determined to have a cubic Spinel structure. Accordingly, it was determined the composition of the composite oxide represented by $LiMn_{1.88}(Li_{0.04}Mg_{0.04})O_4$. Herein, the particle size distribution of the composite oxide was measured, to give the average particle diameter of 20 μm.

Next, a process for surface treatment will be explained in detail.

To ion-exchanged water (100 ml) in which aluminum nitrate ($Al(NO_3)_3$, 3.7 g) and lithium hydroxide (LiOH, 0.6 g) were dissolved, was added ion-exchanged water (100 ml) in which ammonium phosphate dibasic ($(NH_4)_2HPO_4$, 1.1 g) and lithium hydroxide (LiOH, 1.2 g) were dissolved, to prepare a mixed solution. Then, to the mixed solution, was added the composite oxide (100 g) and the mixed solution was stirred for 1 hr at ambient temperature. The resultant solution was dried up by a spray-dryer. The powder thus obtained was placed in a high purity alumina vessel and heated at 650° C. for 5 hr in the air.

The surface modified composite oxide thus obtained was pre-treated by ion-milling. Then, the resultant product was measured by TEM, revealing that a thickness of the coating layer was about 30 nm (see FIGS. 1 and 2). FIG. 2 shows the results of the line analysis on the distribution of the main elements present near the coating layer.

As shown in FIG. 2, it is clarified that the atomic densities of O (oxygen) and manganese are substantially constant when the distance of FIG. 2 is in the range from −40 nm to 0 nm. Herein, the above mentioned distance is defined by a distance from the interface between the composite oxide and the coating layer in the cathode. Therefore, the distance of 0 nm means a position on the interface. The region from −40 nm to 0 nm corresponds to a part of the composite oxide as shown in FIG. 2.

Further, when the distance is in the range from 0 nm to 30 nm, the atomic density of manganese decreases to 0 and the atomic density of O (oxygen) also decreases, while the atomic densities of Al and P are observed. The region corresponds to a part of the coating layer. The atomic density of Al gradually decreases from 0 nm to 30 nm. Accordingly, it is determined that in the coating layer, the atomic density of Al at the composite oxide side is higher than the atomic density of Al at the surface side (or electrolyte side) of the coating layer. The coating layer was equally divided into two portions in a thickness direction from the composite oxide side to the surface layer side (or electrolyte side), thereby to measure the average atomic densities of Al at the composite oxide side and the surface layer side (or electrolyte side), respectively. As a result, the atomic density of Al at the composite oxide side was 26 atom % (see Table 1) and the atomic density of Al at the surface layer side (or electrolyte side) was 21 atom % (see Table 1).

Figure 3:
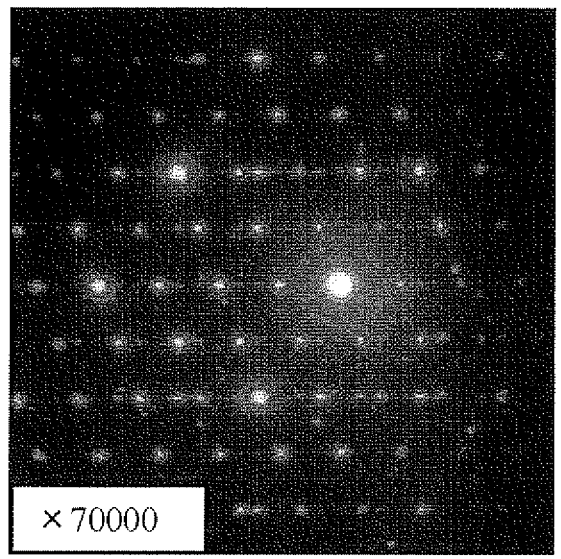
FIG. 3 shows an electron diffraction image of the coating compound including Al of the cathode material in an embodiment of the present invention.
Figure 4:
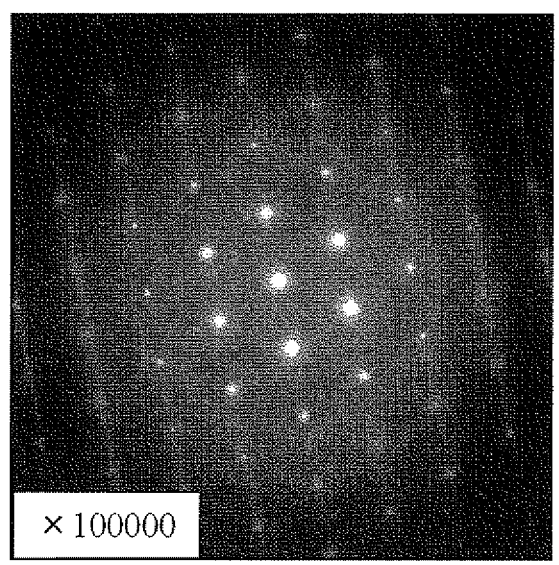
FIG. 4 shows an electron diffraction image of the coating compound including P of the cathode material in an embodiment of the present invention.

FIGS. 3 and 4 show the electron diffraction images of the Al compound and P compound in the coating layer, respectively. When the measured images are compared to the data of the electron diffraction images of the known Al and P compounds in the database based on the detected elements, it is determined that the measured images are identical to $\gamma$-$Al_2O_3$ (No. 10-425 of ICDD (International Centre for Diffraction Data) and $Li_3PO_4$ (No. 15-760 of ICDD), respectively.

Further, when the composite oxide after the surface modified treatment was analyzed by ICP, the weight rates of Al and P in the coating layer to Mn in the composite oxide were 0.4% and 0.4%, respectively (wherein, Mn rate was 100%). Herein, the coating compounds analyzed by the electron diffraction images are determined as $\gamma$-$Al_2O_3$ and $Li_3PO_4$. Accordingly, it is determined that the composite oxide is coated with $\gamma$-$Al_2O_3$ in about 0.5 wt % (see Table 1) and $Li_3PO_4$ in about 1.0 wt % (see Table 1), respectively based on the stoichimetric quantity.

Next, a method for producing a test battery will be described in detail.

(Preparation of Cathode for Test Battery)

A cathode of a test battery was produced by using the surface modified composite oxide thus obtained.

A composite oxide, a carbon based conductive material and a binder dissolved in N-methyl-2-pyrrolidinone (NMP) in advance, were mixed in a rate of 85:10:5 (by mass %) to form a slurry homogeneously mixed. The slurry thus prepared was applied onto a current collector made of an aluminum foil having a thickness of 20 μm. Then, the current collector was dried at 120° C., and pressed in compression molding to have an electrode density of 2.6 g/cm³. After the compression molding, a cathode for a test battery was produced by punching out the molded product to have a disk shape with a diameter of 15 mm.

(Production of Test Battery)

A test battery was produced using the produced cathode, an anode made of metal lithium, and an electrolyte solution which was prepared by dissolving an electrolyte (LiPF$_6$, 1.0 mol) and propene sultone in a mixed solvent of EC (ethylene carbonate), DMC (dimethyl carbonate), and VC (vinylene carbonate).

Next, a method for evaluating the quantity of manganese dissolution using the test battery will be described in detail.

The quantity of manganese dissolution from the cathode of the test battery was evaluated in the following procedure. The test battery was charged to 4.3V with constant current/constant voltage charging at a charge rate of 0.5 C (rate for completing 100% of charging in 2 hr), and discharged to the predetermined voltage at a discharge rate of 0.5 C (rate for completing 100% of discharging in 2 hr).

The above mentioned process was repeatedly conducted for 3 cycles. Herein, 1 cycle is composed of one charging and one discharging. Then, the battery was charged to 4.3V with constant current/constant voltage charging at a charge rate of 0.5 C. After the treatment, the test battery was disassembled to take out the cathode. The cathode thus charged was placed in a vessel made of perfluoro resin (PFA) in a glove box under the argon atmosphere. To the vessel, was added an electrolyte solution (5 cc) prepared by dissolving LiPF$_6$ (1 mol/l) in the mixed organic solvent of EC (ethylene carbonate) and DMC (dimethyl carbonate) at a volume rate of 1:2. Then, the vessel was sealed.

The vessel was taken out from the glove box, placed in a thermostatic chamber at 80° C. and left for one week. After one week, the vessel was taken out from the thermostatic chamber, and the electrolyte solution (5 cc) was taken out in a glove box under the argon atmosphere. The quantity of manganese dissolved in the resultant electrolyte solution was analyzed by an ICP spectrometer.

The quantity of the manganese dissolution analyzed and calculated by the ICP spectrometer was 5 ppm by weight (see Table 1).

<Production of 18650-Type Battery>

Next, a method for producing a 18650-type battery will be described in detail.

A 18650 (diameter of 18 mm×height of 650 mm)-type battery was prepared by using the cathode material thus obtained as mentioned above. First, a composite oxide, a conductive material of a carbon based powder and a binder of PVdF (PolyVinylidene diFluoride) were mixed at a rate of 90:5:5 (by weight rate). Then to the mixture was added an appropriate volume of N-methyl-2-pyrrolidinone (NMP) to form a slurry.

The slurry thus prepared was kneaded by a planetary mixer by stirring for 3 hr.

Then, the kneaded slurry was applied to both sides of an aluminum foil with a thickness of 20 μm by using a roll transfer to produce a current collector of the cathode 1. The product thus obtained was pressed so that the density of the mixed agents was 2.60 g/cm³ to obtain an electrode for the cathode.

Next, in the preparation of the anode 2, amorphous carbon used as an anode active material, carbon black used as a conductive material and PVdF used as a binder were mixed in a ratio of 92:2:6 by weight, and kneaded with stirring by a slurry mixer.

The kneaded slurry was applied to both sides of a copper foil with a thickness of 10 μm to produce a current collector of the anode 2. The product thus obtained was dried, and pressed to obtain an electrode for the anode.

The electrodes for the cathode and the anode were cut out in a predetermined size, respectively, and a cathode lead 7 and an anode lead 5 each serving as a current collecting tab were arranged respectively at the area to which no slurry was applied in each electrode by ultrasonic welding.

The separator 3 made of porous polyethylene film was placed between the cathode 1 and the anode. Then, the cathode 1 and the anode 2 were wound spirally via the separator 3 in a cylinder shape, and housed in the 18650-type battery can 4.

The cathode lead 7 serving as a current collecting tab was connected with the cap 6 of the battery can 4. The, the cap 6 of the battery can 4 was welded with the battery can 4 to seal the battery.

Finally, a non-aqueous electrolyte solution was poured into the battery can 4 through a pouring inlet arranged on the battery can 4 to obtain a 18650-type battery (lithium secondary battery 10).

Next, an evaluation method of the charge/discharge cycle profile of the battery will be explained in detail.

The charge/discharge cycle property of the 18650-type battery thus produced as mentioned above was evaluated in the following procedure. The battery was charged with a constant current at a charge rate of 0.5 C to the terminal voltage 4.2V. After the charging, the battery was left for 1 hr, and discharged with the same constant current rate to 2.7V. The charging/discharging cycle was repeated for 1000 cycles, whereby a capacity retention rate (%) was calculated by comparing the capacity after 1000 cycles to the capacity after the first cycle. The test was conducted at 50° C. Table 2 shows the result of the evaluation.

TABLE 2

| Composite Oxide | Discharge Capacity (Ah/kg) | Capacity Retention Rate (%) |
|---|---|---|
| Example 1 | 101 | 78 |

In Table 2, the discharge capacity (Ah/kg) is an electric quantity capable of being extracted from the oxide composite (lithium manganese composite oxide) of the electrode material per unit weight.

Example 2

In Example 2, a composite oxide (lithium manganese composite oxide) was prepared in the same method as in Example 1. Then, a surface modified composite oxide was prepared by conducting the thermal treatment after the surface modification under the atmosphere of nitrogen trifluoride (NF$_3$) gas instead of the air.

In Example 2, a thickness of the coating layer was 40 nm and an average atomic density of Al at the composite oxide side was 25 atom % in the coating layer, while an average atomic density of Al at the surface layer side (or electrolyte side) was 20 atom %. The electron diffraction images of the coating compounds containing Al and P in the coating layer were identical to the diffraction image of AlF$_3$ (ICDD, No. 44-231) and that of Li$_3$PO$_4$ (ICDD, No. 15-760), respectively.

The ICP analysis of the composite oxide after the surface modification thereof showed that the weight rates of Al and P in the coating layer to Mn of the complex oxide were 0.4% and 0.4%, respectively (wherein, Mn rate was 100%).

The profiles of the composite oxide prepared in Example 2 are shown in Table 3.

TABLE 3

| Composite Oxide | $LiMn_{2-x}N_xO_4$ | | | Thickness Coating Layer (nm) | Atomic Density of M | | Amount of M Compound (wt %) | Amount of $Li_3PO_4$ (wt %) | Mn Dissolution (wt ppm) |
|---|---|---|---|---|---|---|---|---|---|
| | x | N | M | | Composite Oxide Side (atom %) | Surface Layer Side (atom %) | | | |
| Example 2 | 1.88 | Li, Mg | Al | 40 | 25 | 20 | 0.8 | 1 | 3 |
| Example 3 | 1.88 | Li, Mg | Mg | 30 | 28 | 24 | 0.5 | 1 | 4 |
| Example 4 | 1.88 | Li, Mg | Al | 30 | 29 | 25 | 0.7 | 1 | 2 |
| Example 5 | 1.88 | Li, Mg | Cu | 40 | 25 | 18 | 0.5 | 1 | 5 |
| Example 6 | 1.8 | Li, Al | Mg | 20 | 21 | 16 | 0.3 | 2 | 3 |
| Example 7 | 1.9 | Li, Al | Mg | 60 | 30 | 25 | 1.5 | 0.5 | 3 |
| Example 8 | 1.9 | Li, Ni | Al | 10 | 22 | 18 | 0.3 | 0.5 | 7 |
| Example 9 | 1.88 | Li, Mg | Al, Mg | 40 | 26 | 20 | 0.6 | 1.5 | 6 |
| Example 10 | 1.8 | Li, Al | Al, Cu | 30 | 25 | 16 | 0.6 | 0.5 | 5 |
| Example 11 | 1.7 | Li, Al | Mg | 4 | 18 | 13 | 0.1 | 0.1 | 8 |
| Example 12 | 1.95 | Li, Ni | Al | 100 | 33 | 26 | 3 | 5 | 4 |

The results obtained from the electron diffraction images indicated that the composite oxide was covered with $AlF_3$ and $Li_3PO_4$ at the rates of about 0.8 wt % and about 1.0 wt %, respectively as shown in Table 3 (wherein the composite oxide rate was 100 wt %). Further, the manganese dissolution concentration in the electrolyte solution is 3 wt ppm.

Next, a 18650-type battery was produced in the same method as in Example 1, and the capacity retention rate was evaluated. The results are summarized in Table 4.

TABLE 4

| Composite Oxide | Discharge Capacity (Ah/kg) | Capacity Retention Rate (%) |
|---|---|---|
| Example 2 | 98 | 75 |
| Example 3 | 101 | 81 |
| Example 4 | 97 | 75 |
| Example 5 | 100 | 70 |
| Example 6 | 95 | 73 |
| Example 7 | 91 | 80 |
| Example 8 | 100 | 74 |
| Example 9 | 99 | 79 |
| Example 10 | 92 | 72 |
| Example 11 | 90 | 70 |
| Example 12 | 95 | 70 |

Here, similarly to Table 2, the discharge capacity (Ah/kg) in Table 4 is an electric quantity capable of being extracted from the oxide composite (lithium manganese composite oxide) of the electrode material per unit weight.

The capacity retention rates shown in Table 4 were evaluated in the same procedure as in Example 1. The battery was charged with a constant current at a charge rate of 0.5 C to the terminal voltage 4.2V. After the charging, the battery was left for 1 hr, and discharged with the same constant current rate to 2.7V. The charging/discharging cycle was repeated for 1000 cycles, whereby a capacity retention rate (%) was calculated by comparing the capacity after 1000 cycles to the capacity after the first cycle. The test was conducted at 50° C. As shown in Table 4, it is revealed that the cathode prepared in Example 2 has a charge capacity of 98 Ah/kg and a capacity retention rate of 75%, indicating the high performance thereof.

Example 3

In Example 3, a composite oxide (lithium manganese composite oxide) was prepared in the same method as in Example 1. As the materials used for the surface modification, magnesium nitrate ($Mg(NO_3)_2$; 5.6 g) and lithium hydroxide (LiOH, 1.0 g) were used instead of aluminum nitrate ($Al(NO_3)_3$; 3.7 g) and lithium hydroxide (LiOH; 0.6 g), whereby a surface modified composite oxide was prepared.

In Example 3, a thickness of the coating layer was 30 nm and an average atomic density of Mg at the composite oxide side was 28 atom % in the coating layer, while an average atomic density of Mg at the surface layer side (or electrolyte side) was 24 atom %. The electron diffraction images of the coating compounds containing Mg and P in the coating layer were identical to the electron diffraction image of MgO (ICDD, No. 45-946) and that of $Li_3PO_4$ (ICDD, No. 15-760), respectively. The ICP analysis of the composite oxide after the surface modification thereof showed that the weight rates of Mg and P in the coating layer to Mn of the complex oxide were 1.0% and 0.4%, respectively (wherein, Mn rate was 100%).

The profile of the composite oxide prepared in Example 3 is shown in Table 3.

The results obtained from the electron diffraction images indicated that the composite oxide was covered with MgO and $Li_3PO_4$ at the rates of about 0.5 wt % and about 1.0 wt %, respectively as shown in Table 3 (wherein, the composite oxide rate was 100 wt %). Further, the manganese dissolution concentration in the electrolyte solution was 4 wt ppm.

Next, a 18650-type battery was produced in the same method as in Example 1, and the capacity retention rate was evaluated. The results are summarized in Table 4.

As shown in Table 4, it is revealed that the cathode prepared in Example 3 has a charge capacity of 101 Ah/kg and a capacity retention rate of 81%, indicating the high performance thereof.

Example 4

In Example 4, a composite oxide was prepared in the same method as in Example 1. The composed oxide was treated by the surface modification with the same materials used in Example 3, magnesium nitrate ($Mg(NO_3)_2$; 5.6 g) and lithium hydroxide (LION; 1.0 g). Then, a surface modified composite oxide was prepared by conducting the thermal treatment after the surface modification under nitrogen trifluoride ($NF_3$) gas atmosphere instead of the air.

In Example 4, a thickness of the coating layer was 30 nm and an average atomic density of Mg at the composite oxide side was 29 atom % in the coating layer, while an average atomic density of Mg at the surface layer side (or electrolyte side) was 25 atom %. The electron diffraction images of the coating compounds containing Mg and P in the coating layer were identical to the electron diffraction image of $MgF_2$ (ICDD, No. 41-1443) and that of $Li_3PO_4$ (ICDD, No. 15-760), respectively. The ICP analysis of the composite oxide after the surface modification thereof showed that the weight rates of Mg and P in the coating layer to Mn of the complex oxide were 1.0% and 0.4%, respectively (wherein, Mn rate was 100%).

The profile of the composite oxide prepared in Example 4 is shown in Table 3.

The results obtained from the electron diffraction images indicated that the composite oxide was covered with $MgF_2$ and $Li_3PO_4$ at the rates of about 0.7 wt % and about 1.0 wt %, respectively as shown in Table 3 (wherein the composite oxide rate was 100 wt %). Further, the manganese dissolution concentration in the electrolyte solution was 2 wt ppm.

Next, a 18650-type battery was produced in the same method as in Example 1, and the capacity retention rate was evaluated. The results are summarized in Table 4.

As shown in Table 4, it is revealed that the cathode prepared in Example 4 has a charge capacity of 97 Ah/kg and a capacity retention rate of 75%, also indicating the high performance thereof.

Example 5

In Example 5, a composite oxide was prepared in the same method as in Example 1. As the materials used for the surface modification, copper nitrate ($Cu(NO_3)_2$; 1.9 g) and lithium hydroxide (LiOH; 0.6 g) were used instead of aluminum nitrate ($Al(NO_3)_3$; 3.7 g) and lithium hydroxide (LiOH; 0.6 g), whereby a surface modified composite oxide was prepared.

In Example 5, a thickness of the coating layer was 40 nm and an average atomic density of Cu at the composite oxide side was 25 atom % in the coating layer, while an average atomic density of Cu at the surface layer side (or electrolyte side) was 18 atom %. The electron diffraction images of the coating compounds containing Cu and P in the coating layer were identical to the electron diffraction image of CuO (ICDD, No. 5-661) and that of $Li_3PO_4$ (ICDD, No. 15-760), respectively. The ICP analysis of the composite oxide after the surface modification thereof showed that the weight rates of Cu and P in the coating layer to Mn of the complex oxide were 0.7% and 0.4%, respectively (wherein, Mn rate was 100%).

The profile of the composite oxide prepared in Example 5 is shown in Table 3.

The results obtained from the electron diffraction images indicated that the composite oxide was covered with CuO and $Li_3PO_4$ at the rates of about 0.5 wt % and about 1.0 wt %, respectively as shown in Table 3 (wherein, composite oxide rate=100 wt %). Further, the manganese dissolution concentration in the electrolyte solution was 5 wt ppm.

Next, a 18650-type battery was produced in the same method as in Example 1, and the capacity retention rate was evaluated. The results are summarized in Table 4.

As shown in Table 4, it is revealed that the cathode prepared in Example 5 has a charge capacity of 100 Ah/kg and a capacity retention rate of 70%, also indicating the high performance thereof.

Example 6

In Example 6, as a material of a composite oxide, aluminum oxide ($Al_2O_3$) was used instead of magnesium oxide (MgO) in Example 1. The materials were weighed so that the rate of Li:Mn:Al was 1.08:1.80:0.12, whereby a composite oxide was prepared in the same method as in Example 1. The composite oxide in Example 6 had a Spinel structure having a composition represented by $LiMn_{1.80}(Li_{1.08}Al_{0.12})O_4$ with an average particle diameter of 24 μm.

In Example 6, as the materials used for the surface modification, magnesium nitrate ($Mg(NO_3)_2$; 2.2 g) and lithium hydroxide (LiOH; 0.7 g) were used instead of aluminum nitrate ($Al(NG_3)_3$; 3.7 g) and lithium hydroxide (LiCH, 0.6 g) in Example 1. Further, ammonium phosphate dibasic ($(NH_4)_2HPO_4$, 2.2 g) and lithium hydroxide (LiOH, 2.4 g) were used instead of ammonium phosphate dibasic ($(NH_4)_2HPO_4$, 1.1 g) and lithium hydroxide (LiOH, 1.2 g). Using the above mentioned materials, a surface modified complex oxide was prepared.

In Example 6, a thickness of the coating layer was 20 nm and an average atomic density of Mg at the composite oxide side was 21 atom % in the coating layer, while an average atomic density of Mg at the surface layer side (or electrolyte side) was 16 atom %. The electron diffraction images of the coating compounds containing Mg and P in the coating layer were identical to the electron diffraction image of MgO (ICDD, No. 45-946) and that of $Li_3PO_4$ (ICDD, No. 15-760), respectively. The ICP analysis of the composite oxide after the surface modification thereof showed that the weight rates of Mg and P in the coating layer to Mn of the complex oxide were 0.6% and 0.8%, respectively (wherein, Mn rate was 100%).

The profile of the composite oxide prepared in Example 6 is shown in Table 3.

The results obtained from the electron diffraction images indicated that the composite oxide was covered with MgO and $Li_3PO_4$ at the rates of about 0.3 wt % and about 2.0 wt %, respectively as shown in Table 3 (wherein the composite oxide rate was 100 wt %). Further, the manganese dissolution concentration in the electrolyte solution was 3 wt ppm.

Next, a 18650-type battery was produced in the same method as in Example 1, and the capacity retention rate was evaluated. The results are summarized in Table 4.

As shown in Table 4, it is revealed that the cathode prepared in Example 6 has a charge capacity of 95 Ah/kg and a capacity retention rate of 73%, also indicating the high performance thereof.

Example 7

In Example 7, the rates of the materials used for preparing the composite oxide in Example 6 were changed. The materials were weighed so that the rate of Li:Mn:Al was 1.04:1.90:0.06, whereby a composite oxide was prepared in the same method as in Example 1. The composite oxide in Example 7 had a Spinel structure having a composition represented by $LiMn_{1.90}(Li_{0.04}Al_{0.06})O_4$ with an average particle diameter of 15 μm.

In Example 7, as the materials used for the surface modification, magnesium nitrate ($Mg(NO_3)_2$; 11 g) and lithium hydroxide (LiOH; 3.5 g) were used instead of aluminum nitrate ($Al(NO_3)_3$; 3.7 g) and lithium hydroxide (LiOH; 0.6 g) in Example 1. Further, ammonium phosphate dibasic ($(NH_4)_2HPO_4$, 0.6 g) and lithium hydroxide (LiOH, 0.7 g) were used instead of ammonium phosphate dibasic ($(NH_4)_2HPO_4$, 1.1 g)

and lithium hydroxide (LiOH, 1.2 g). Using the above mentioned materials, a surface modified complex oxide was produced.

In Example 7, a thickness of the coating layer was 60 nm and an average atomic density of Mg at the composite oxide side was 30 atom % in the coating layer, while an average atomic density of Mg at the surface layer side (or electrolyte side) was 25 atom %. The electron diffraction images of the coating compounds containing Mg and P in the coating layer were identical to the electron diffraction image of MgO (ICDD, No. 45-946) and that of $Li_3PO_4$ (ICDD, No. 15-760), respectively. The ICP analysis of the composite oxide after the surface modification thereof showed that the weight rates of Mg and P in the coating layer to Mn of the complex oxide were 3.1% and 0.2%, respectively (wherein, Mn rate was 100%).

The profile of the composite oxide prepared in Example 7 is shown in Table 3.

The results obtained from the electron diffraction images indicated that the composite oxide was covered with MgO and $Li_3PO_4$ at the rates of about 1.5 wt % and about 0.5 wt %, respectively as shown in Table 3 (wherein the composite oxide rate was 100 wt %). Further, the manganese dissolution concentration in the electrolyte solution was 3 wt ppm.

Next, a 18650-type battery was produced in the same method as in Example 1, and the capacity retention rate was evaluated. The results are summarized in Table 4.

As shown in Table 4, it is revealed that the cathode prepared in Example 7 has a charge capacity of 91 Ah/kg and a capacity retention rate of 80%, also indicating the high performance thereof.

Example 8

In Example 8, as a material of a composite oxide, nickel oxide ($Ni_2O_3$) was used instead of magnesium oxide (MgO) in Example 1. The materials were weighed so that the rate of Li:Mn:Ni was 1.06:1.90:0.04, whereby a composite oxide was prepared in the same method as in Example 1. The composite oxide in Example 8 had a Spinel structure having a composition represented by $LiMn_{1.90}(Li_{0.06}Ni_{0.04})O_4$ with an average particle diameter of 19 μm.

In Example 8, as the materials used for the surface modification, aluminum nitrate ($Al(NO_3)_3$; 2.2 g) and lithium hydroxide (LiOH; 0.4 g) were used instead of aluminum nitrate ($Al(NO_2)_2$; 3.7 g) and lithium hydroxide (LiOH, 0.6 g) in Example 1. Further, ammonium phosphate dibasic ($(NH_4)_2HPO_4$, 10.6 g) and lithium hydroxide (LiOH, 0.7 g) were used instead of ammonium phosphate dibasic ($(NH_4)_2HPO_4$, 1.1 g) and lithium hydroxide (LiOH, 1.2 g). Using the above mentioned materials, a surface modified complex oxide was produced.

In Example 8, a thickness of the coating layer was 10 nm and an average atomic density of Al at the composite oxide side was 22 atom % in the coating layer, while an average atomic density of Al at the surface layer side (or electrolyte side) was 18 atom %. The electron diffraction images of the coating compounds containing Mg and P in the coating layer were identical to the electron diffraction image of $\gamma$-$Al_2O_3$ (ICDD, No. 10-425) and that of $Li_3PO_4$ (ICDD, No. 15-760), respectively. The ICP analysis of the composite oxide after the surface modification thereof showed that the weight rates of Al and P in the coating layer to Mn of the complex oxide were 0.3% and 0.2%, respectively (wherein, Mn rate was 100%).

The profile of the composite oxide prepared in Example 8 is shown in Table 3.

The results obtained from the electron diffraction images indicated that the composite oxide was covered with $\gamma$-$Al_2O_3$ and $Li_3PO_4$ at the rates of about 0.3 wt % and about 0.5 wt %, respectively as shown in Table 3 (wherein the composite oxide rate was 100 wt %). Further, the manganese dissolution concentration in the electrolyte solution was 7 wt ppm.

Next, a 18650-type battery was produced in the same method as in Example 1, and the capacity retention rate was evaluated. The results are summarized in Table 4.

As shown in Table 4, it is revealed that the cathode prepared in Example 8 has a charge capacity of 100 Ah/kg and a capacity retention rate of 74%, also indicating the high performance thereof.

Example 9

In Example 9, a composite oxide was prepared in the same method as in Example 1. As the materials used for the surface modification, aluminum nitrate ($Al(NO_3)_3$; 2.2 g) and magnesium nitrate ($Mg(NO_3)_2$; 3.3 g) were used instead of aluminum nitrate ($Al(NO_3)_3$; 3.7 g). Further, ammonium phosphate dibasic ($(NH_4)_2HPO_4$, 1.6 g) and lithium hydroxide (LiOH, 1.8 g) were used instead of ammonium phosphate dibasic ($(NH_4)_2HPO_4$, 1.1 g) and lithium hydroxide (LiOH, 1.2 g). Using the above mentioned materials, a surface modified composite compound was prepared by changing the thermal treatment temperature from 650° C. to 500° C.

In Example 9, a thickness of the coating layer was 40 nm and an average atomic density of Mg at the composite oxide side was 26 atom % in the coating layer, while an average atomic density of Mg at the surface layer side (or electrolyte side) was 20 atom %. The electron diffraction images of the coating compounds containing Al, Mg and P in the coating layer were identical to the electron diffraction image of $\gamma$-$Al_2O_3$ (ICDD, No. 10-425), that of MgO (ICDD, No. 45-946) and that of $Li_3PO_4$ (ICDD, No. 15-760), respectively. The ICP analysis of the composite oxide after the surface modification thereof showed that the weight rates of Al, Mg and P in the coating layer to Mn of the complex oxide were 0.3%, 0.6% and 0.6%, respectively (wherein, Mn rate was 100%).

The profile of the composite oxide prepared in Example 9 is shown in Table 3.

The results obtained from the electron diffraction images indicate that the composite oxide is covered with $\gamma$-$Al_2O_3$, MgO and $Li_3PO_4$ at the rates of about 0.3 wt %, about 0.3 wt % and about 1.5 wt %, respectively as shown in Table 3 (wherein the composite oxide rate was 100 wt %). Further, the manganese dissolution concentration in the electrolyte solution was 6 wt ppm.

Next, a 18650-type battery was produced in the same method as in Example 1, and the capacity retention rate was evaluated. The results are summarized in Table 4.

As shown in Table 4, it is revealed that the cathode prepared in Example 9 has a charge capacity of 99 Ah/kg and a capacity retention rate of 79%, also indicating the high performance thereof.

Example 10

In Example 10, a composite oxide was prepared in the same method as in Example 6.

Next, as the materials used for the surface modification, aluminum nitrate ($Al(NO_3)_3$; 2.2 g), copper nitrate ($Cu(NO_3)_2$; 1.2 g) and lithium hydroxide (LiOH; 0.5 g) were used instead of aluminum nitrate ($Al(NO_3)_3$; 3.7 g) and lithium hydroxide (LiOH; 0.6 g) in Example 1. Further, ammonium phosphate dibasic (NH$_4$)$_2$HPO$_4$, 0.6 g) and lithium hydroxide (LiOH; 0.6 g) were used instead of ammonium phosphate dibasic (NH$_4$)$_2$HPO$_4$, 1.1 g) and lithium hydroxide (LiOH; 1.2 g). Using the above mentioned materials, a surface modified composite compound was prepared.

In Example 10, a thickness of the coating layer was 30 nm and an average atomic density of Cu at the composite oxide side was 25 atom % in the coating layer, while an average atomic density of Cu at the surface layer side (or electrolyte side) was 16 atom %. The electron diffraction images of the coating compounds containing Al, Cu and P in the coating layer were identical to the electron diffraction image of γ-Al$_2$O$_3$ (ICDD, No. 10-425), that of CuO (ICDD, No. 5-661) and that of Li$_3$PO$_4$ (ICDD, No. 15-760) respectively. The ICP analysis of the composite oxide after the surface modification thereof showed that the weight rates of Al Cu and P in the coating layer to Mn of the complex oxide were 0.3%, 0.4% and 0.2%, respectively (wherein the Mn rate was 1000).

The profile of the composite oxide prepared in Example 10 is shown in Table 3.

The results obtained from the electron diffraction images indicated that the composite oxide was covered with γ-Al$_2$O$_3$, CuO and Li$_3$PO$_4$ at the rates of about 0.3 wt %, 0.3 wt % and 0.5 wt %, respectively as shown in Table 3 (wherein, composite oxide rate=100 wt %). Further, the manganese dissolution concentration in the electrolyte solution was 5 wt ppm.

Next, a 18650-type battery was produced in the same method as in Example 1, and the capacity retention rate was evaluated. The results are summarized in Table 4.

As shown in Table 4, it is revealed that the cathode prepared in Example 10 has a charge capacity of 92 Ah/kg and a capacity retention rate of 72%, also indicating the high performance thereof.

Example 11

In Example 11, the rates of the materials used for preparing the composite oxide were changed. The materials were weighed so that the rate of Li:Mn:Al was 1.12:1.70:0.18, whereby a composite oxide was prepared in the same method as in Example 1. The composite oxide in Example 11 had a Spinel structure having a composition represented by LiMn$_{1.70}$(Li$_{0.12}$Al$_{0.18}$)O$_4$ with an average particle diameter of 25 μm.

As the materials used for the surface modification, magnesium nitrate (Mg(NO$_3$)$_2$; 1.1 g) and lithium hydroxide (LiOH; 0.2 g) were used instead of aluminum nitrate (Al(NO$_3$)$_3$; 3.7 g) and lithium hydroxide (LiOH, 0.6 g) in Example 1. Further, ammonium phosphate dibasic (NH$_4$)$_2$HPO$_4$, 0.1 g) and lithium hydroxide (LiOH, 0.1 g) were used instead of ammonium phosphate dibasic (NH$_4$)$_2$HPO$_4$, 1.1 g) and lithium hydroxide (LiOH; 1.2 g). Using the above mentioned materials, a surface modified complex oxide was produced.

In Example 11, a thickness of the coating layer was 4 nm and an average atomic density of Mg at the composite oxide side was 18 atom % in the coating layer, while an average atomic density of Mg at the surface layer side (or electrolyte side) was 13 atom %. The electron diffraction images of the coating compounds containing Mg and P in the coating layer were identical to the electron diffraction image of MgO (ICDD, No. 45-946) and that of Li$_2$PO$_4$ (ICDD, No. 15-760), respectively. The ICP analysis of the composite oxide after the surface modification thereof showed that the weight rates of Mg and P in the coating layer to Mn of the complex oxide were 0.1% and 0.1%, respectively (wherein, Mn rate was 1000).

The profile of the composite oxide prepared in Example 11 is shown in Table 3.

The results obtained from the electron diffraction images indicated that the composite oxide was covered with MgO and Li$_3$PO$_4$ at the rates of about 0.1 wt % and about 0.1 wt %, respectively as shown in Table 3 (wherein the composite oxide rate was 100 wt %). Further, the manganese dissolution concentration in the electrolyte solution was 8 wt ppm.

Next, a 18650-type battery was produced in the same method as in Example 1, and the capacity retention rate was evaluated. The results are summarized in Table 4.

As shown in Table 4, it is revealed that the cathode prepared in Example 11 has a charge capacity of 90 Ah/kg and a capacity retention rate of 70%, also indicating the high performance thereof.

Example 12

In Example 12, as a material of a composite oxide, nickel oxide (Ni$_2$O$_3$) was used instead of magnesium oxide (MgO) in Example 1. The materials were weighed so that the rate of Li:Mn:Ni was 1.02:1.95:0.03, whereby a composite oxide was prepared in the same method as in Example 1. The composite oxide in Example 12 had a Spinel structure having a composition represented by LiMn$_{1.95}$(Li$_{0.02}$Ni$_{0.03}$)O$_4$ with an average particle diameter of 16 μm.

Next, as the materials used for the surface modification, aluminum nitrate (Al(NO$_3$)$_3$; 22 g) and lithium hydroxide (LiOH; 3.6 g) were used instead of aluminum nitrate (Al(NO$_3$)$_3$; 3.7 g) and lithium hydroxide (LiOH; 0.6 g) in Example 1. Further, ammonium phosphate dibasic (NH$_4$)$_2$HPO$_4$, 5.5 g) and lithium hydroxide (LiOH, 6.0 g) were used instead of ammonium phosphate dibasic (NH$_4$)$_2$HPO$_4$, 1.1 g) and lithium hydroxide (LiOH, 1.2 g). Using the above mentioned materials, a surface modified complex oxide was produced.

In Example 12, a thickness of the coating layer was 100 nm and an average atomic density of Al at the composite oxide side was 33 atom % in the coating layer, while an average atomic density of Al at the surface layer side (or electrolyte side) was 26 atom %. The electron diffraction images of the coating compounds containing Al and P in the coating layer were identical to the electron diffraction image of γ-Al$_2$O$_3$ (ICDD, No. 10-425) and that of Li$_3$PO$_4$ (ICDD, No. 15-760), respectively. The ICP analysis of the composite oxide after the surface modification thereof showed that the weight rates of Al and P in the coating layer to Mn of the complex oxide were 2.4% and 2.1%, respectively (wherein, Mn rate was 100%).

The profile of the composite oxide prepared in Example 12 is shown in Table 3.

The results obtained from the electron diffraction images indicated that the composite oxide was covered with γ-Al$_2$O$_3$ and Li$_3$PO$_4$ at the rates of about 3.0 wt % and about 5.0 wt %, respectively as shown in Table 3 (wherein the composite oxide rate was 100 wt %). Further, the manganese dissolution concentration in the electrolyte solution was 4 wt ppm.

Next, a 18650-type battery was produced in the same method as in Example 1, and the capacity retention rate was evaluated. The results are summarized in Table 4.

As shown in Table 4, it is revealed that the cathode prepared in Example 12 has a charge capacity of 95 Ah/kg and a capacity retention rate of 70%, also indicating the high performance thereof.

Comparative Example 1

As mentioned above, in the coating layers in Examples 1 to 12, there is a density gradient of M of the coating compounds between at the composite oxide side and at the surface layer side (or electrolyte side) in the coating layer. That is, the atomic density of M at the composite oxide side is higher than that of M at the surface layer side (or electrolyte side) in Examples 1 to 12. Herein, M is at least one element selected from the group of Mg, Al and Cu and contained in an oxide compound or a fluoride compound of the coating compounds forming the coating layer.

In Comparative Example 1, a cathode including a coating layer having no density gradient of M therein was prepared and compared to the cathodes in Examples 1 to 12.

In Comparative Example 1, a composite oxide was prepared in the same method as in Example 1.

Then, as materials of forming the coating layer used in the surface modification, $Al_2O_3$ (0.5 g) and $Li_3PO_4$ (1.0 g) were mixed, and the resultant mixture was further mixed with a composite oxide (100 g) by a ball mill for 1 hr. The powder thus obtained was heated at 650° C. in the air for 5 hr to prepare a surface modified composite oxide.

In Comparative Example 1, a thickness of the coating layer was 40 nm and an average atomic density of Al at the composite oxide side was 20 atom % in the coating layer, while an average atomic density of Al at the surface layer side (or electrolyte side) was 19 atom %. Accordingly, the coating layer with substantially no density gradient of Al was obtained. The electron diffraction images of the coating compounds containing Al and P in the coating layer were identical to the electron diffraction image of $\alpha$-$Al_2O_3$ (ICDD, No. 10-173) and that of $Li_3PO_4$ (ICDD, No. 15-760), respectively. The ICP analysis of the composite oxide after the surface modification thereof showed that the weight rates of Al and P in the coating layer to Mn of the complex oxide were 0.4% and 0.4%, respectively (wherein the Mn rate was 1000).

The profile of the composite oxide prepared in Comparative Example 1 is shown in Table 5.

Next, a 18650-type battery was produced in the same method as in Example 1, and the capacity retention rate was evaluated. The results are summarized in Table 6.

TABLE 6

| Composite Oxide | Discharge Capacity (Ah/kg) | Capacity Retention Rate (%) |
|---|---|---|
| Comparative Example 1 | 100 | 64 |
| Comparative Example 2 | 90 | 60 |
| Comparative Example 3 | 101 | 45 |

As shown in Table 6, the cathode prepared in Comparative Example 1 has a capacity retention rate of 64%, while the cathode prepared in Example 1 has a capacity retention rate of 78% as shown in Table 2 and the cathodes prepared in Examples 2 to 12 have a capacity retention rate in the range from 70% to 81% as shown in Table 4.

Accordingly, it is revealed that the capacity retention rate of the cathode prepared in Comparative Example 1 is inferior to those of the cathodes prepared in Examples 1 to 12.

Comparative Example 2

In Comparative Example 2, a coating layer is prepared so that the atomic density of M of an oxide compound or a fluoride compound consisting of the coating compounds is decreased at the composite oxide side, while that of M is increased at the surface side (or electrolyte side). Herein, M is at least one element selected from the group of Mg, Al and Cu, and the coating layer is formed by the coating compounds. Accordingly, the density gradient of M in Comparative

TABLE 5

| Composite Oxide | $LiMn_{2-N}N_xO_4$ | | | Thickness Coating Layer (nm) | Atomic Density of M | | Amount of M Compound (wt %) | Amount of $Li_3PO_4$ (wt %) | Mn Dissolution (wt ppm) |
|---|---|---|---|---|---|---|---|---|---|
| | x | N | M | | Composite Oxide Side (atom %) | Surface Layer Side (atom %) | | | |
| Comparative Example 1 | 1.88 | Li, Mg | Al | 40 | 20 | 19 | 0.5 | 1 | 10 |
| Comparative Example 2 | 1.88 | Li, Mg | Al | 30 | 15 | 25 | 0.5 | 1 | 18 |
| Comaprative Example 3 | 1.88 | Li, Mg | Non | 10 | — | — | — | 1 | 25 |

The results obtained from the electron diffraction images indicated that the composite oxide was covered with $\alpha$-$Al_2O_3$ and $Li_3PO_4$ at the rates of about 0.5 wt % and about 1.0 wt % in the coating layer, respectively (wherein the composite oxide rate was 100 wt %). Further, the manganese dissolution concentration in the electrolyte solution was 10 wt ppm.

Herein, in Comparative Example 1, the manganese dissolution concentration in the electrolyte solution was increased compared to those in Example 1 to 12 (the manganese dissolution concentration in the electrolyte solution was in the range from 2 to 8 wt ppm, as shown in Tables 1 and 3). This increased concentration may be caused by the decrease of the suppressing effect of the coating compounds on the manganese dissolution, even though the amounts of the coating compounds were the same, because Al (or M of the coating compound) in the coating layer was substantially uniformly distributed.

Example 2 is opposite to that of M in the coating layer each in Examples 1 to 12 in which the atomic density of M in the coating layer at the composite oxide side is higher than that of M at the surface layer side (or electrolyte side).

Therefore, in Comparative Example 2, a cathode including a coating layer having the opposite density gradient of M to that of M each in Examples 1 to 12 was prepared and compared.

In Comparative Example 2, a composite oxide was prepared in the same method as in Example 1.

Then, in the surface modified treatment forming a coating layer, to ion-exchanged water (100 ml) in which ammonium phosphate dibasic $(NH_4)_2HPO_4$, 1.1 g) and lithium hydroxide (LiOH, 1.2 g) were dissolved, was added the composite oxide. The resultant mixture was stirred at ambient temperature for 1 hr. Then, to the mixture, was added ion-exchanged water (100 ml) in which aluminum nitrate $(Al(NO_3)_3;$ 3.7 g)

and lithium hydroxide (LiOH; 0.6 g) were dissolved. The resultant mixture was stirred again at ambient temperature for 30 min to give a solution. The solution thus obtained was dried by a spray-dryer to give a powder, and the resultant powder was placed in a high purity alumina vessel and heated at 600° C. for 5 hr.

In Comparative Example 2, a thickness of the coating layer was 30 nm and an average atomic density of Al at the composite oxide side was 15 atom % in the coating layer, while an average atomic density of Al at the surface layer side (or electrolyte side) was 25 atom %. Accordingly, the coating layer with opposite density gradient of Al to that each in Examples 1 to 12 was obtained. The electron diffraction images of the coating compounds containing Al and P in the coating layer were identical to the electron diffraction image of $\gamma$-$Al_2O_3$ (ICDD, No. 10-425) and that of $Li_3PO_4$ (ICDD, No. 15-760), respectively. The ICP analysis of the composite oxide after the surface modification thereof showed that the weight rates of Al and P in the coating layer to Mn of the complex oxide were 0.4% and 0.4%, respectively (wherein the Mn rate was 100%).

The profile of the composite oxide prepared in Comparative Example 2 is shown in Table 5.

The results obtained from the electron diffraction images indicated that the composite oxide was covered with $\gamma$-$Al_2O_3$ and $Li_3PO_4$ at the rates of about 0.5 wt % and about 1.0 wt % in the coating layer, respectively (wherein the composite oxide rate was 100 wt %).

Here, the manganese dissolution concentration in the electrolyte solution was 18 wt ppm, indicating that the manganese dissolution concentration in Comparative Example 2 was increased compared to that in Example 1 (5 wt ppm in Table 1) and those in Examples 2 to 12 (2 to 8 wt ppm in Table 3). This increase of the manganese dissolution may be caused as follows. That is, Al in the coating layer was heterogeneously distributed in a higher density at the surface layer side (or electrolyte side) than at the composite oxide side. This suggests that $Li_3PO_4$ first coated the composite oxide at the composite oxide side, resulting in insufficient coating of the composite oxide at the surface layer side (or electrolyte side).

Next, a 18650-type battery was produced in the same method as in Example 1, and the capacity retention rate was evaluated. The results are summarized in Table 6.

As shown in Table 6, the discharge capacity (Ah/kg) in Comparative Example 2 is 90 Ah/kg, while the discharge capacity (Ah/kg) in Example 1 is 101 Ah/kg as shown in Table 2 and the discharge capacities (Ah/kg) in Examples 2 to 12 are 90 to 101 Ah/kg as shown in Table 4.

As shown in Table 6, the capacity retention rate in Comparative Example 2 is 60%, while the capacity retention rate in Example 1 is 78% as shown in Table 2 and the capacity retention rates in Examples 2 to 12 are 70 to 81% as shown in Table 4.

Accordingly, it is revealed that the cathode prepared in Comparative Example 2 has an equal or inferior discharge capacity and an inferior capacity retention rate to the cathodes prepared in Examples 1 to 12.

Comparative Example 3

In Comparative Example 3, an oxide compound or a fluoride compound containing M of the coating compounds which form the coating layer is not used (wherein, M is at least one element selected from the group of Mg, Al and Cu). Then, a cathode prepared in Comparative Example 3 is compared to the cathodes prepared in Examples 1 to 12 in which an oxide compound or a fluoride compound containing M is used.

In Comparative Example 3, a composite oxide was prepared in the same method as in Example 1.

Then, in the surface modified treatment forming a coating layer, to ion-exchanged water (100 ml) in which ammonium phosphate dibasic $(NH_4)_2HPO_4$, 1.1 g) and lithium hydroxide (LiOH, 1.2 g) were dissolved, was added the composite oxide. The resultant mixture was stirred at ambient temperature for 1 hr. The solution thus obtained was dried by a spray-dryer to give a powder, and the resultant powder was placed in a high purity alumina vessel and heated at 600° C. for 5 hr.

In Comparative Example 3, a thickness of the coating layer was 10 nm and no metal element except for P was detected in the coating layer. The electron diffraction image of the coating compound containing P in the coating layer was identical to the electron diffraction image of $Li_3PO_4$ (ICDD, No. 15-760), respectively. The ICP analysis of the composite oxide after the surface modification thereof showed that the weight rate of P in the coating layer to Mn of the complex oxide was 0.4% (wherein the Mn rate was 100%).

The profile of the composite oxide prepared in Comparative Example 3 is shown in Table 5.

The results obtained from the electron diffraction image indicated that the composite oxide was covered with $Li_3PO_4$ at the rate of about 1.0 wt % in the coating layer (wherein the composite oxide rate was 100 wt %). The manganese dissolution concentration in the electrolyte solution was 25 wt ppm.

As mentioned above, the manganese dissolution concentration in Comparative Example 3 was increased compared to Examples 1 to 12 (wherein the manganese dissolution concentration was in the range from 2 to 8 wt ppm in Tables 1 and 3). This increase may be caused as follows. That is, the coating layer consisting of $Li_3PO_4$ alone may not have a sufficient suppressing effect on the manganese dissolution because an oxide compound or a fluoride compound each containing M is not included (or absent) in the coating layer (wherein, M is at least one element selected from the group of Mg, Al and Cu).

Next, a 18650-type battery was produced in the same method as in Example 1, and the capacity retention rate was evaluated. The results are summarized in Table 6.

As shown in Table 6, the cathode prepared in Comparative Example 3 has a capacity retention rate of 45%, indicating a remarkably inferior capacity retention rate compared to the cathodes prepared in Examples 1 to 12 indicating the capacity retention rates in the range from 70 to 81% (see Tables 2 and 4).

<Effect>

As mentioned hereinbefore, in the present embodiments, a cathode material for a lithium secondary battery, comprising a coating layer including an oxide compound or a fluoride compound each containing M (M is at least one element selected from the group of Mg, Al and Cu), and a phosphorous compound on the surface of a lithium manganese composite oxide can be provided. Herein, in the coating layer, an atomic density of M present at the side of the lithium manganese composite oxide is higher than an atomic density of M present at the surface layer side (or electrolyte side) of the coating layer. The use of the cathode material for a lithium secondary battery can provide a lithium secondary battery capable of suppressing the manganese dissolution and excellent in a charge/discharge cycle performance.

It should be noted a lithium secondary battery with a particularly long life cycle under high temperature conditions can be provides.

Example 13

Secondary Battery System 10S Equipped With Lithium Secondary Battery 10

Next, in Example 13, a secondary battery system 10S equipped with the lithium secondary battery 10 will be described in detail.

Figure 5:
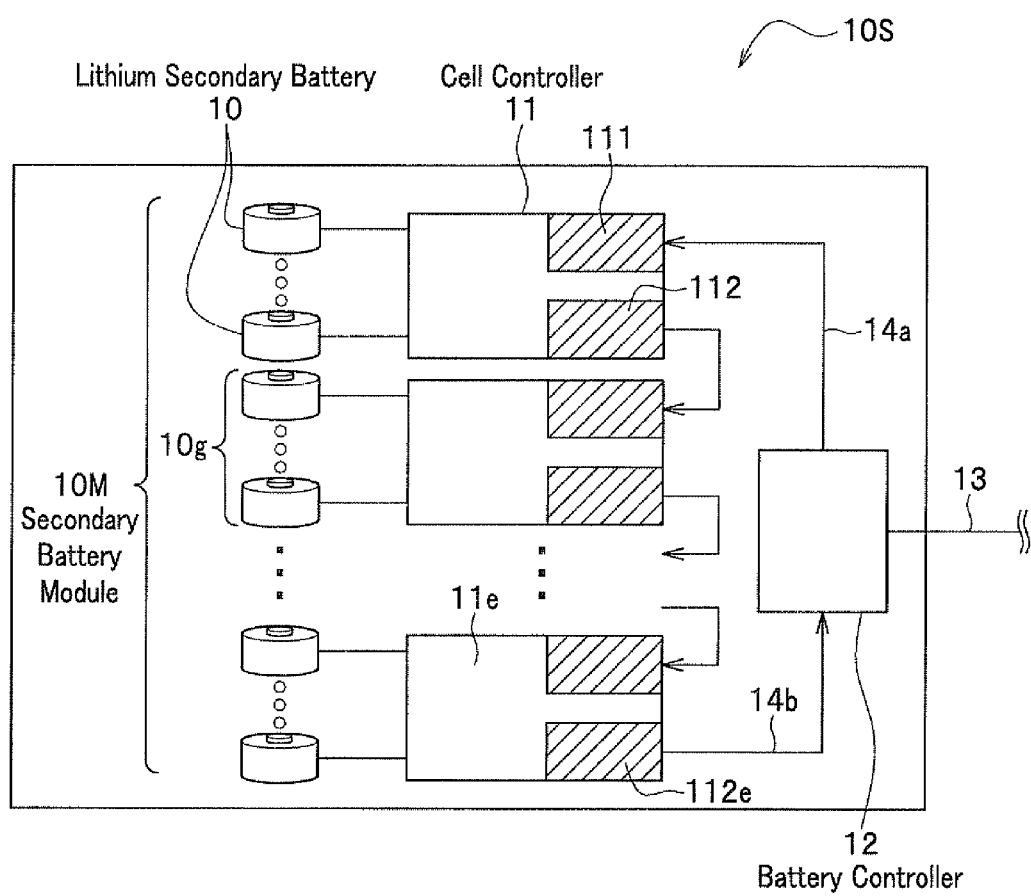
FIG. 5 is a schematic diagram showing a secondary battery system equipped with the lithium second battery prepared in the embodiment of the present invention.

FIG. 5 shows schematically a secondary battery system 10S equipped with the lithium secondary battery 10 prepared in the present embodiment.

A lithium secondary battery group 10g is assembled comprising a plurality of the lithium secondary batteries 10, for example, 4 or more to 16 or less batteries which are connected in series each other. Then, a secondary battery module 10M is assembled comprising a plurality of the lithium secondary battery groups 10g. Here, it should be noted that the number of the lithium secondary batteries 10 included in the lithium secondary battery group 10g may be selected preferably.

The secondary battery module 10M includes a cell controller 11. The cell controller 11 is arranged corresponding to the lithium secondary battery group 10g, and controls the lithium secondary batteries 10. Further, the cell controller 11 detects a voltage between the terminals of the lithium secondary battery 10, and monitors an overcharge or overdischarge state of the lithium secondary battery 10 and a remaining capacity of the lithium secondary battery 10. As mentioned above, the cell controller manages the lithium secondary batteries 10.

A battery controller 12 sends a signal to the cell controller 11, for example, through a communication means 14a, and receives a signal from the cell controller 11, for example, through a communication means 14b. Note that the battery controller 12 is connected with the outside through a signal line 13.

The battery controller 12 performs an input/output management of the electric power with respect to the cell controller 11.

First, the battery controller 12 sends a signal to, for example, an input 111 of the first cell controller 11. Such a signal is continuously transferred from an output 112 of the cell controller 11 to an input 111 of another cell controller 11. Finally, the signal is sent from an output 112e of the last cell controller 11e to the battery controller 12.

The above mentioned process allows the battery controller 12 to monitor (or check) the cell controller 11.

Note that the cell controller 11 and the battery controller 12 are preferably constituted by using a computer and a circuit or the like. However, the present invention is not limited to the above mentioned example.

Further, FIG. 5 shows an example in which the lithium secondary batteries 10 are connected in series, while the lithium secondary batteries 10 may be connected in parallel each other to increase the capacity. Alternatively, the lithium secondary batteries 10 may be connected combining in series and in parallel connections. The connection type is not limited to a specific type and optional connection types may be preferably selected, so long as the lithium secondary batteries 10 are electrically connected each other.

What is claimed is:

1. A cathode for a lithium secondary battery comprising a lithium manganese composite oxide and a coating layer, wherein
the coating layer is formed on a surface of the lithium manganese composite oxide, the coating layer is configured to face an electrolyte and includes one of an oxide compound or a fluoride compound, each of which contains M, wherein M is at least one element selected from the group consisting of Mg, Al and Cu, and the coating layer further comprises a phosphorous compound,
the coating layer comprises an atomic density gradient of M and an atomic density gradient of the phosphorus compound, and
an atomic density of M in a side of the coating layer facing the lithium manganese composite oxide is higher than an atomic density of M in a side of the coating layer configured to face the electrolyte.

2. The cathode for a lithium secondary battery according to claim 1, wherein
the phosphorous compound is at least one compound selected from the group consisting of $Li_3PO_4$, $Li_4P_2O_7$ and $LiPO_3$.

3. The cathode for a lithium secondary battery according to claim 1, wherein
an atomic density of phosphor of the phosphorous compound in the side of the coating layer facing the lithium manganese composite oxide is lower than an atomic density of phosphor in the side the coating layer configured to face the electrolyte.

4. The cathode for a lithium secondary battery according to claim 1, wherein
the lithium manganese composite oxide has a cubic Spinel structure represented by a composition formula of $LiMn_xN_{2-x}O_4$, wherein $1.7 \leq x \leq 1.95$; and N is at least one element selected from the group consisting of Li, Mg, Al and Ni.

5. The cathode for a lithium secondary battery according to claim 1, wherein
a content of the one of the oxide compound or the fluoride compound each of which contains M is equal to or more than 0.1 wt % and equal to or less than 3.0 wt % to a content of the lithium manganese composite oxide as being 100 wt %.

6. The cathode for a lithium secondary battery according to claim 1, wherein
a content of the phosphorous compound is equal to or more than 0.1 wt % and equal to or less than 5.0 wt % to a content of the lithium manganese composite oxide as being 100 wt %.

7. The cathode for a lithium secondary battery according to claim 1, wherein
a thickness of the coating layer is equal to or more than 4 nm and equal to or less than 100 nm.

8. A lithium secondary battery comprising the cathode for a lithium secondary battery according to claim 1.

9. The lithium secondary battery according to claim 8, wherein
a capacity retention rate of the battery is 70% or more, when a charge/discharge cycle is conducted for 1000 cycles at 50° C., at a charge/discharge rate of 0.5 C, and at a voltage in the range from 2.7V or more to 4.2V or less.

10. A secondary battery module comprising:
a plurality of the lithium secondary batteries according to claim 8 electrically connected each other,
a controller detecting a voltage between terminals of the plurality of the lithium secondary batteries and controlling conditions of the plurality of the lithium secondary batteries.

11. A secondary battery module comprising:
a plurality of batteries electrically connected each other, and a controller managing and controlling conditions of the plurality of the batteries, wherein
the controller detects a voltage between terminals of the plurality of the batteries,
each of the plurality of the batteries is constituted so that a layered body comprising a cathode, an anode and an electrolyte is housed in a battery can forming an outer package of the battery,
the cathode comprises a lithium manganese composite oxide and a coating layer; the coating layer is formed on a surface of the lithium manganese composite oxide, the coating layer faces the electrolyte and includes one of an oxide compound or a fluoride compound, each of which contains M, wherein M is at least one element selected from the group consisting of Mg, Al and Cu, and the coating layer further comprises a phosphorous compound,
the coating layer comprises an atomic density gradient of M and an atomic density gradient of the phosphorus compound, and
an atomic density of M in a side of the coating layer facing the lithium manganese composite oxide is higher than an atomic density of M in a side of the coating layer facing the electrolyte.

12. A secondary battery module according to claim 11, wherein
an atomic density of phosphor in the side of the coating layer facing the lithium manganese composite oxide is lower than an atomic density of phosphor in the side of the coating layer facing the electrolyte.

13. The cathode for a lithium secondary battery according to claim 1 wherein
the phosphorous compound is $Li_3PO_4$, and
a thickness of the coating layer is equal to or more than 4 nm and equal to or less than 100 nm.

14. The cathode for a lithium secondary battery according to claim 13, wherein
an atomic density of M in the side of the coating layer facing the lithium manganese composite oxide is 4 atom % or more higher than an atomic density of M in the side of the coating layer configured to face the electrolyte.

15. The cathode for a lithium secondary battery according to claim 13, wherein
an atomic density of phosphor of the phosphorous compound in the side of the coating layer facing the lithium manganese composite oxide is lower than an atomic density of phosphor in the side of the coating layer configured to face the electrolyte.

16. The cathode for a lithium secondary battery according to claim 13, wherein
the lithium manganese composite oxide has a cubic Spinel structure represented by a composition formula of $LiMn_xN_{2-x}O_4$, wherein $1.7 \leq x \leq 1.95$; and N is at least one element selected from the group consisting of Li, Mg, Al and Ni.

17. The cathode for a lithium secondary battery according to claim 13, wherein
a content of the one of the oxide compound or the fluoride compound each of which contains M is equal to or more than 0.1 wt % and equal to or less than 3.0 wt to the lithium manganese composite oxide as being 100 wt %.

18. The cathode for a lithium secondary battery according to claim 13, wherein
a content of the phosphorous compound is equal to or more than 0.1 wt and equal to or less than 5.0 wt % to the lithium manganese composite oxide as being 100 wt %.

19. A cathode for a lithium secondary battery comprising:
a lithium manganese composite oxide; and
a coating layer formed on a surface of the lithium manganese composite oxide, the coating layer comprising one of an oxide compound or a fluoride compound, each of which contains M, wherein M is at least one element selected from the group consisting of Mg, Al and Cu, and the coating layer further comprising a phosphorous compound,
wherein the coating layer comprises an atomic density gradient of M and an atomic density gradient of the phosphorus compound, and
an atomic density of M in a side of the coating layer adjacent to the lithium manganese composite oxide is higher than an atomic density of M in a surface layer side of the coating layer opposite to the side of the coating layer adjacent to the lithium manganese composite oxide.

* * * * *